Sept. 20, 1960 P. G. PERRIN 2,952,954
PACKAGING MACHINE
Filed March 25, 1957 12 Sheets-Sheet 3
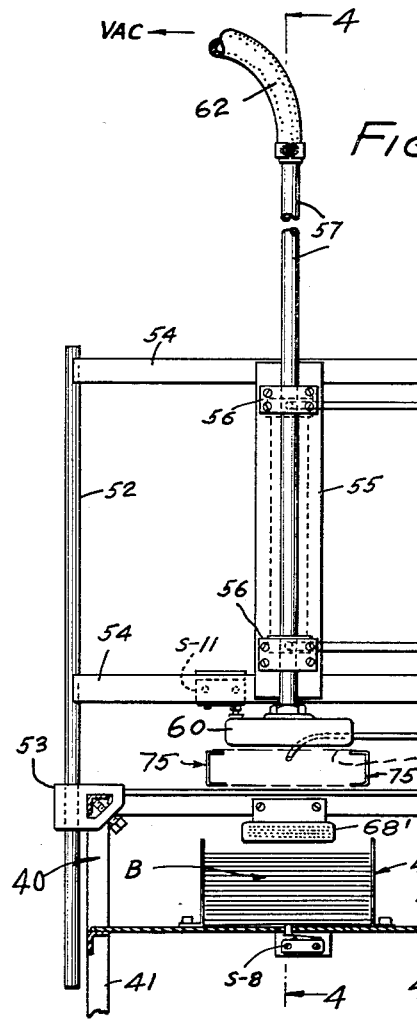
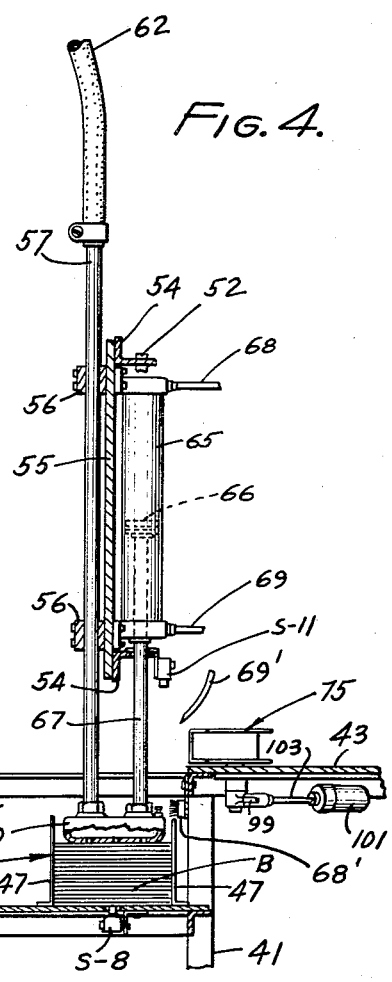
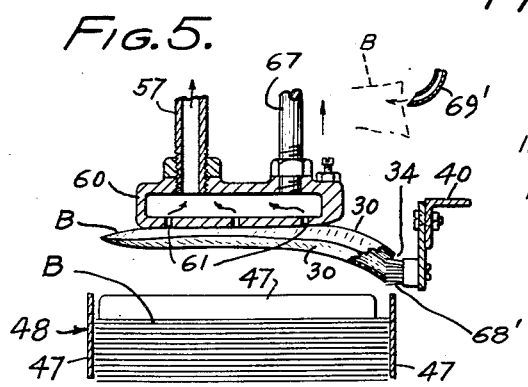
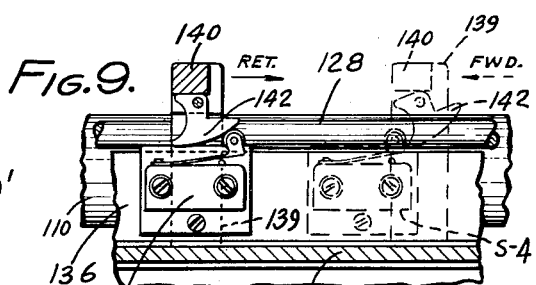
INVENTOR:
PHILLIP G. PERRIN
BY
R. E. Jeangue
ATTORNEY Sept. 20, 1960  P. G. PERRIN  2,952,954
PACKAGING MACHINE
Filed March 25, 1957  12 Sheets-Sheet 4
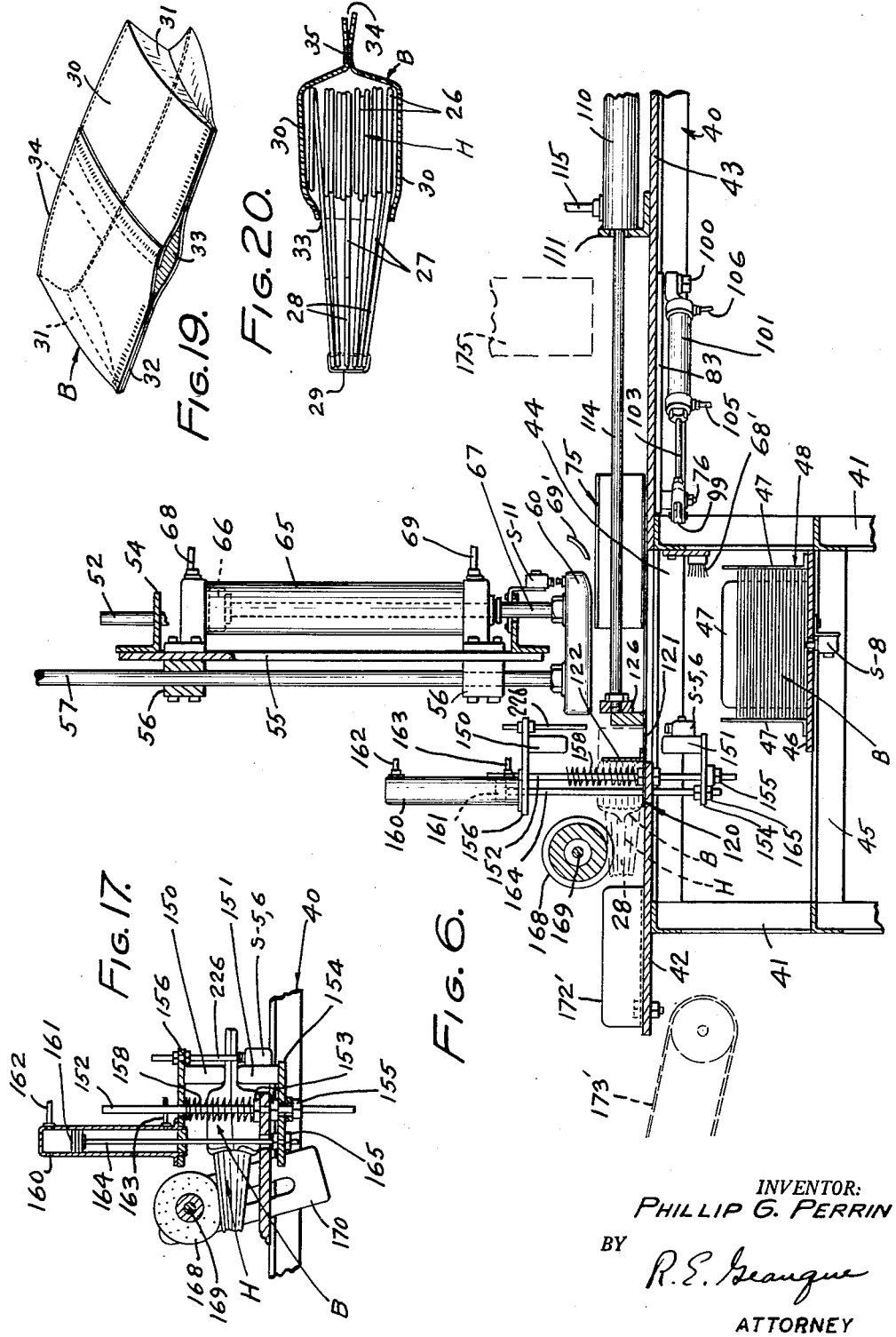
INVENTOR:
PHILLIP G. PERRIN
BY
R.E. Geaugue
ATTORNEY Sept. 20, 1960
P. G. PERRIN
2,952,954
PACKAGING MACHINE
Filed March 25, 1957
12 Sheets-Sheet 5
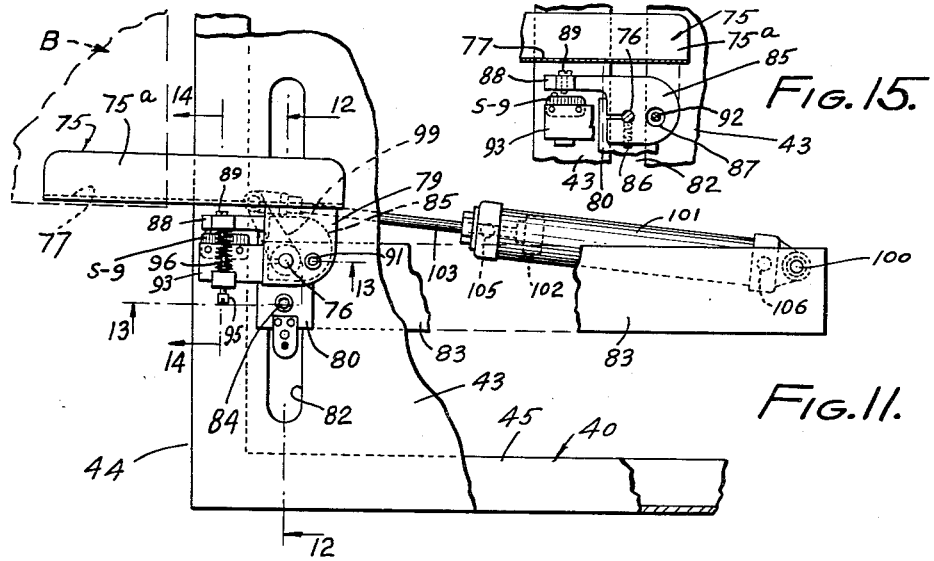
Fig. 15.
Fig. 11.
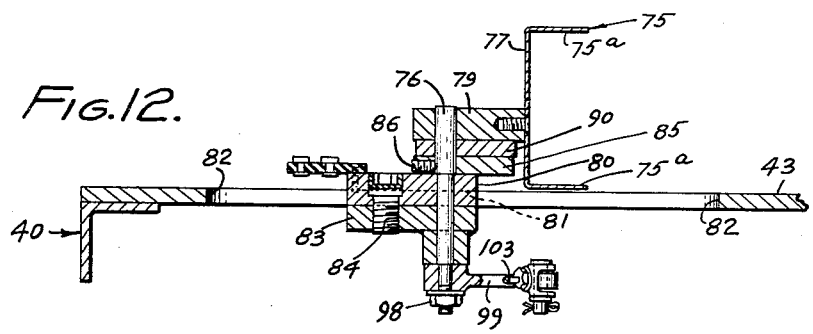
Fig. 12.
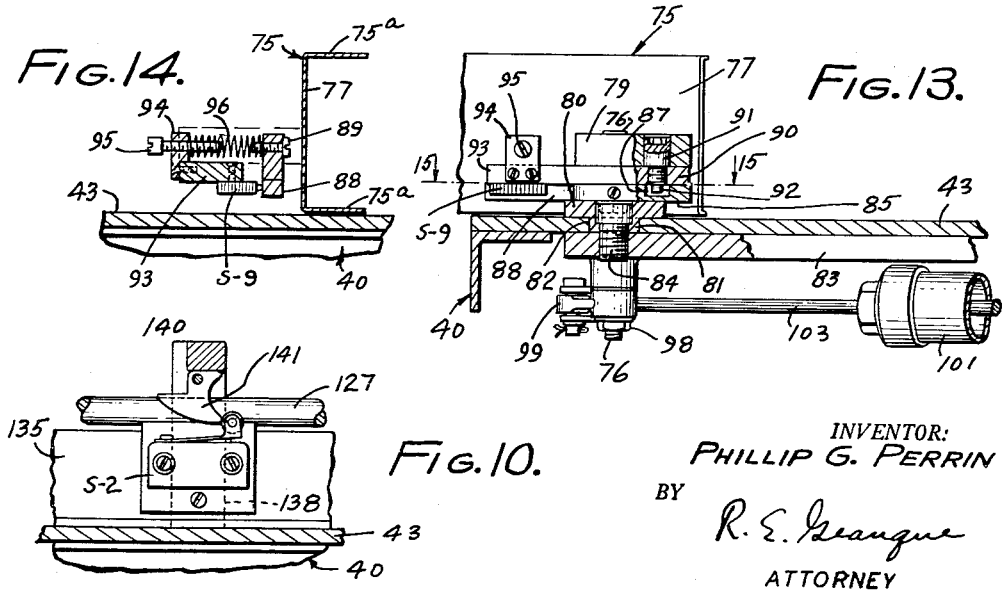
Fig. 14.
Fig. 13.
Fig. 10.
INVENTOR:
PHILLIP G. PERRIN
BY
R. E. Deangue
ATTORNEY

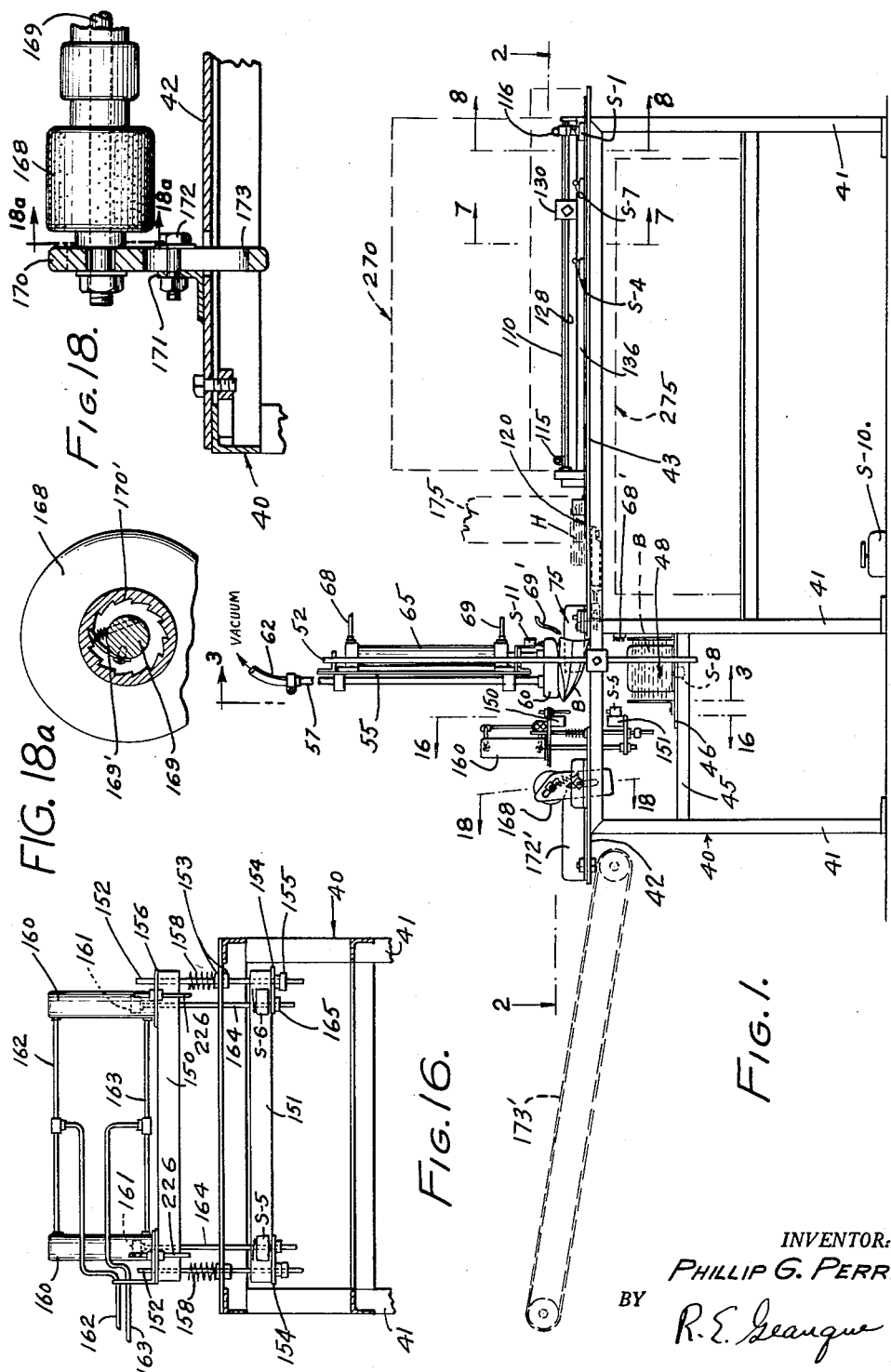

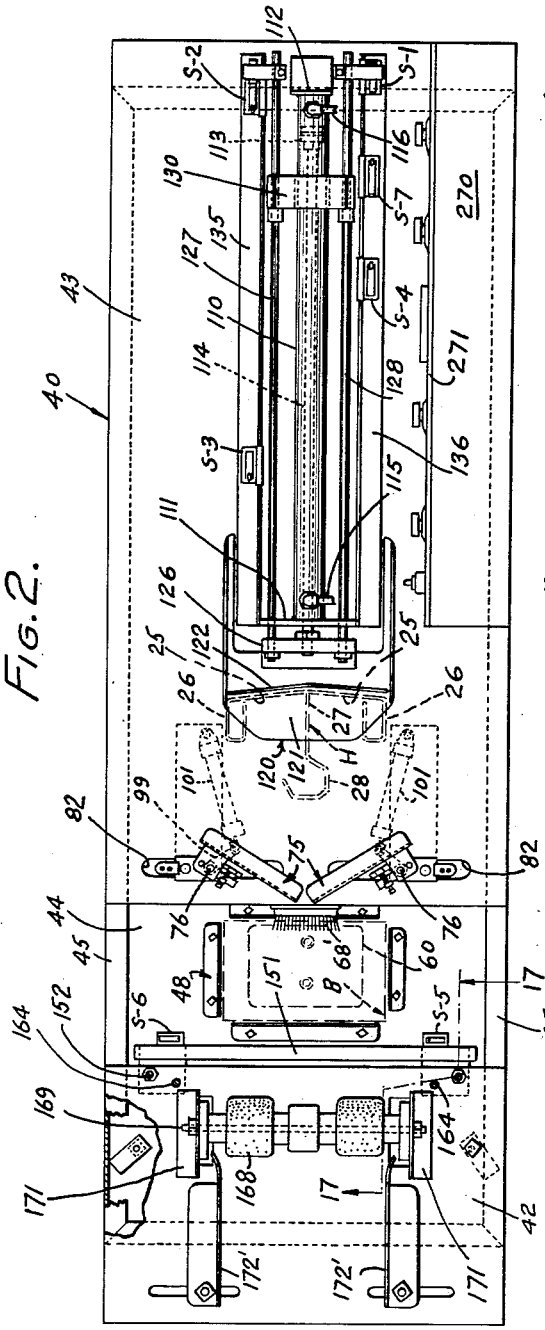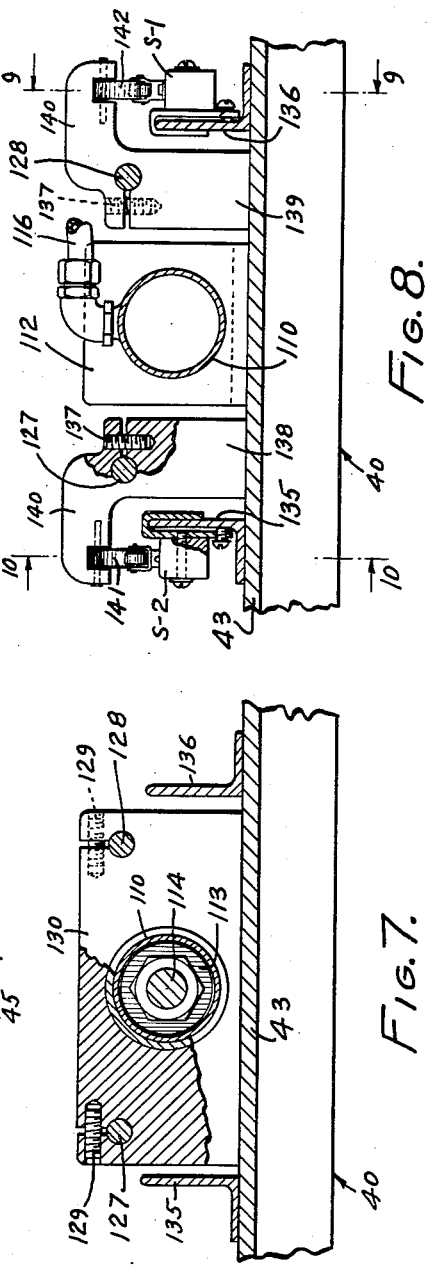

INVENTOR.
PHILLIP G. PERRIN

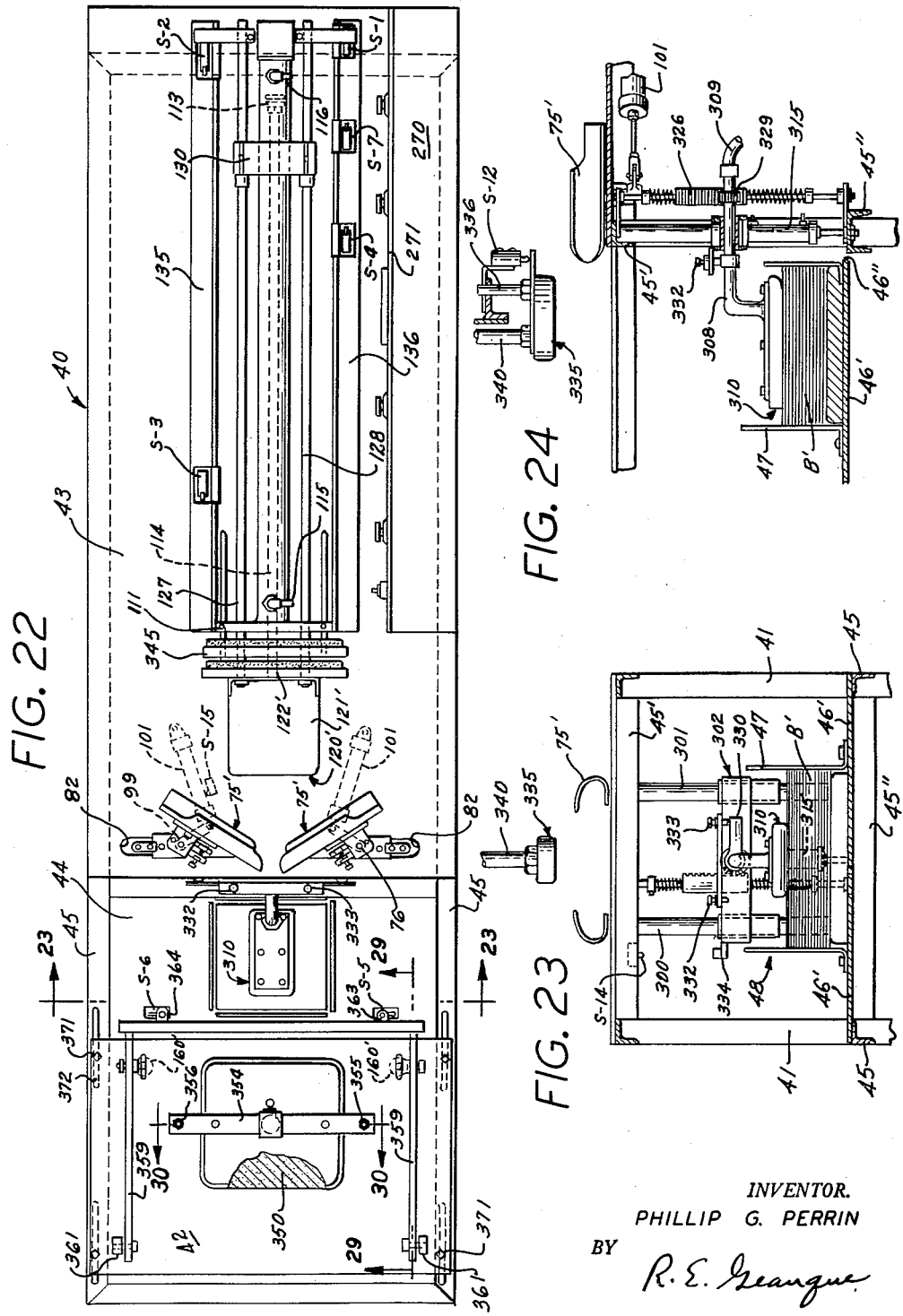

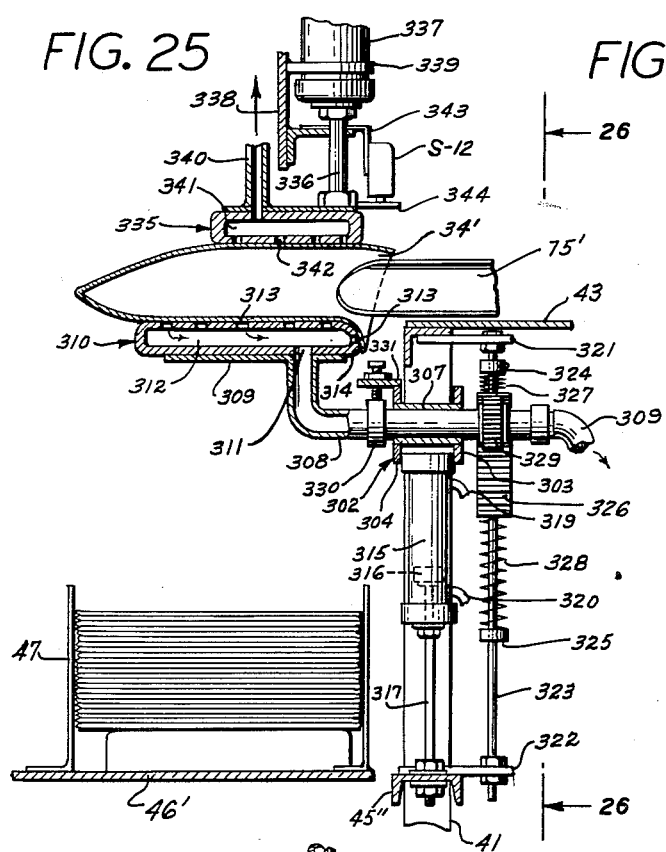
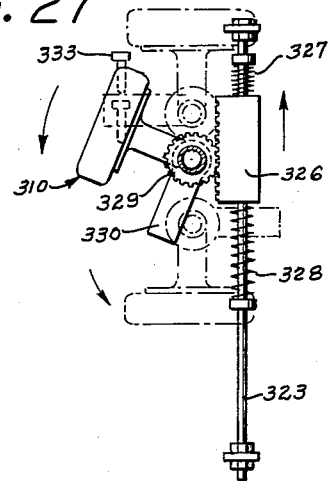
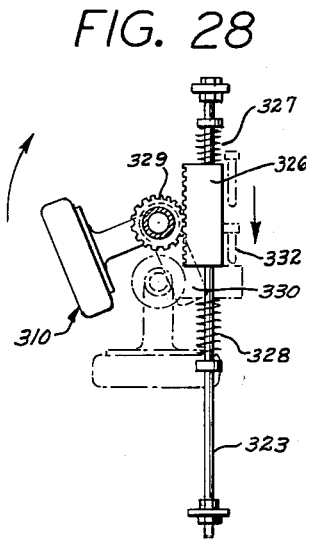
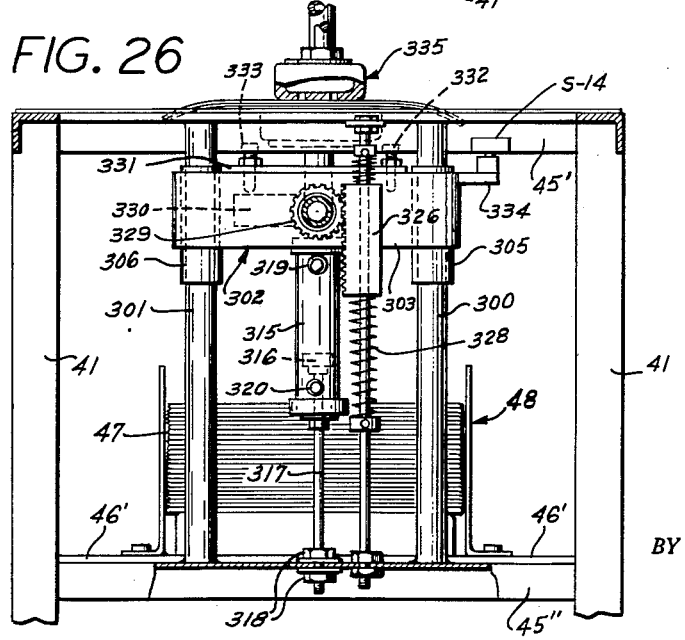

Sept. 20, 1960 P. G. PERRIN 2,952,954
PACKAGING MACHINE
Filed March 25, 1957 12 Sheets-Sheet 9
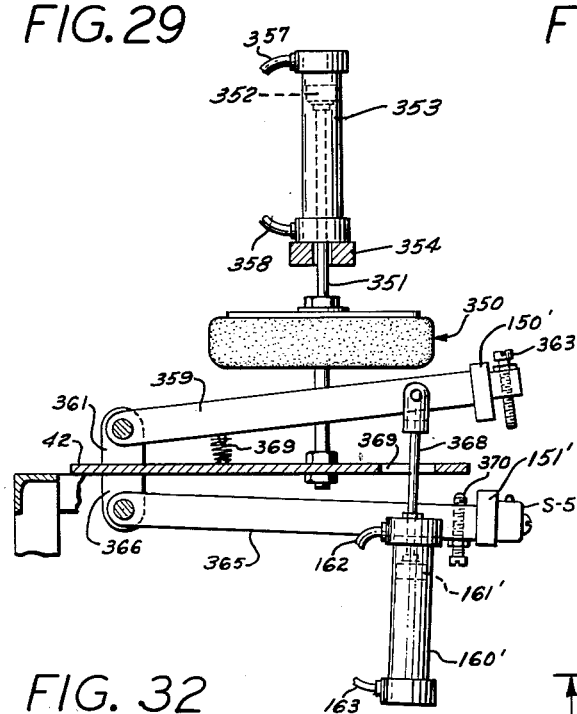
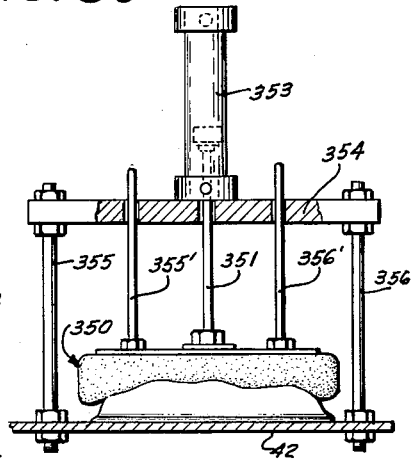
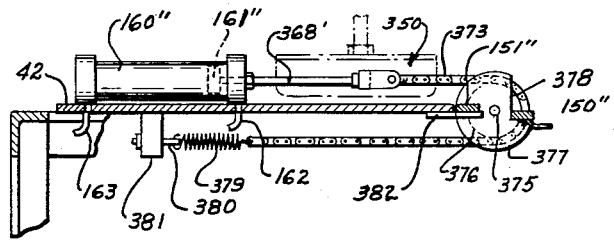
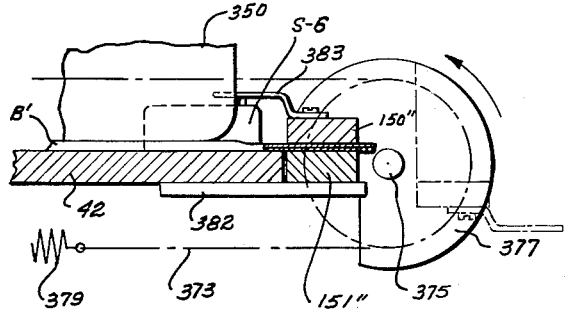
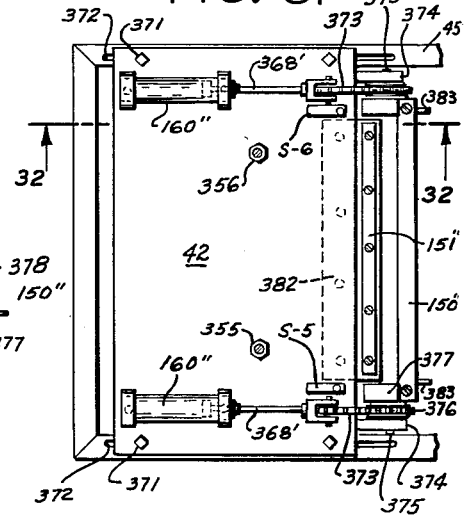
INVENTOR.
PHILLIP G. PERRIN
BY R. E. Geauque
ATTORNEY Sept. 20, 1960

P. G. PERRIN 2,952,954

PACKAGING MACHINE

Filed March 25, 1957

INVENTOR.
PHILLIP G. PERRIN

BY R. E. Geauque

ATTORNEY

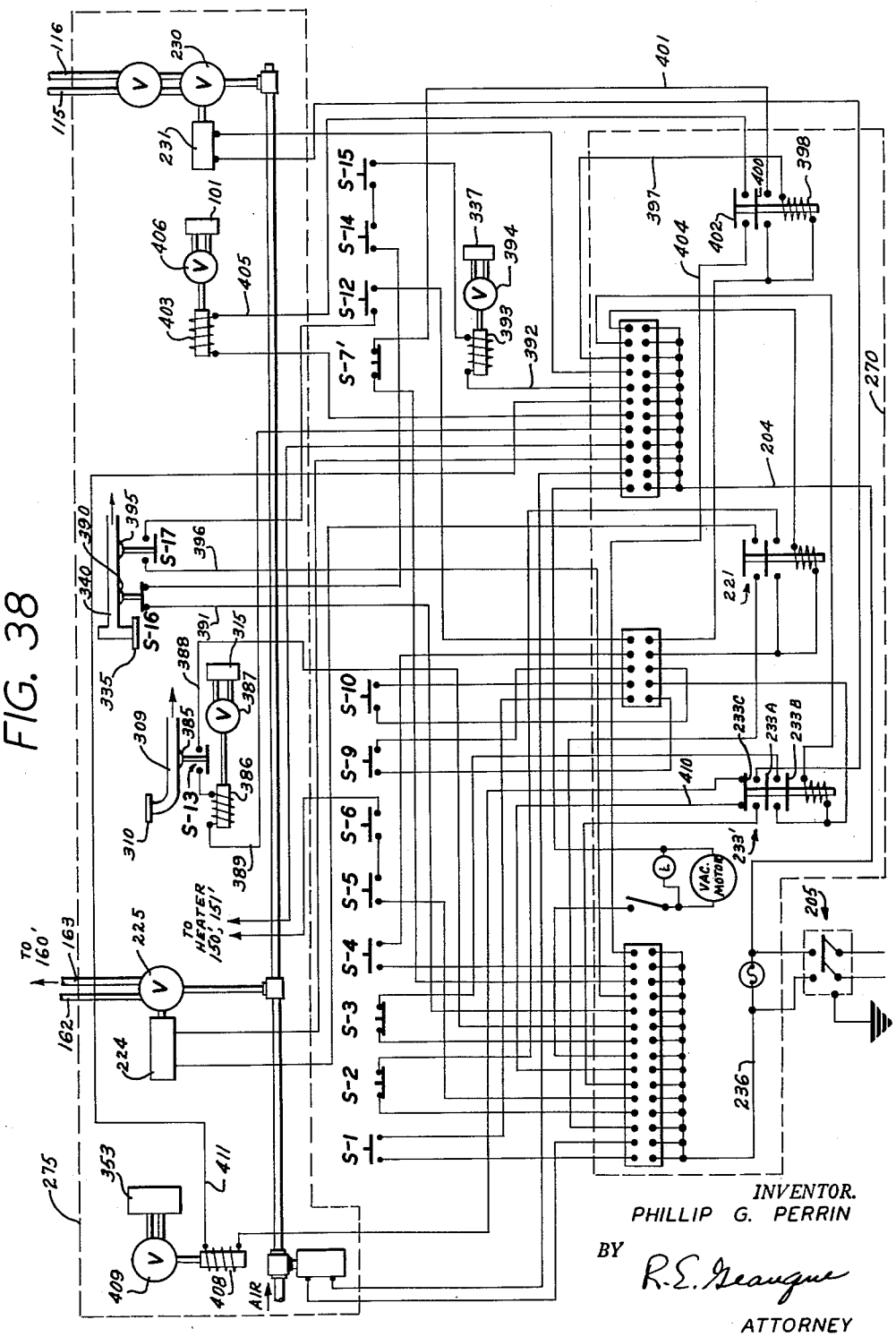

Sept. 20, 1960 P. G. PERRIN 2,952,954
PACKAGING MACHINE
Filed March 25, 1957 12 Sheets-Sheet 12
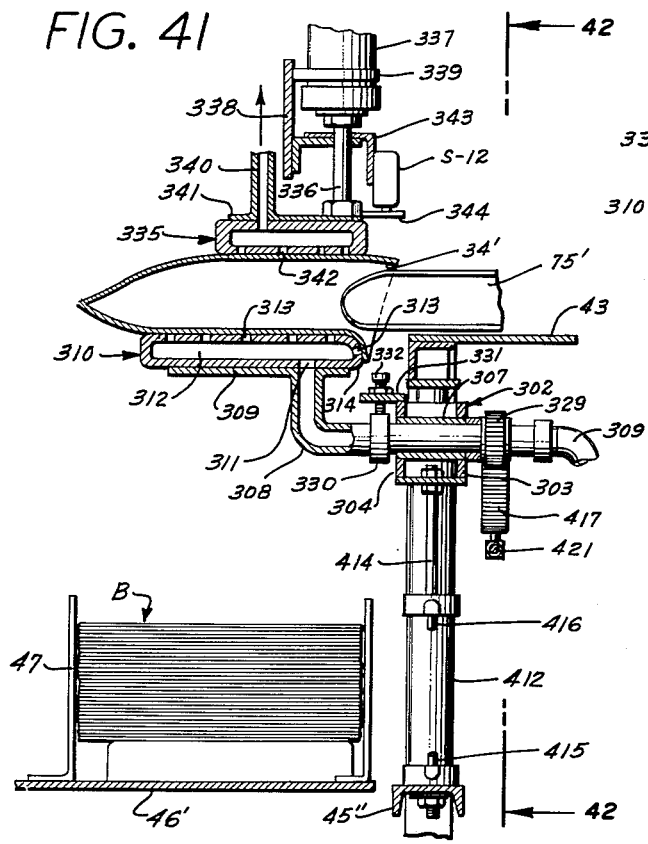
FIG. 41
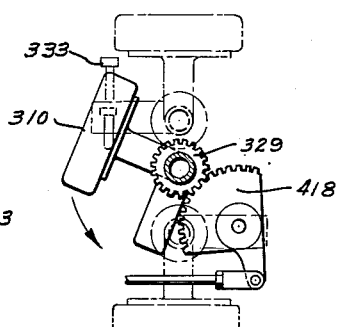
FIG. 43
FIG. 42
FIG. 44
INVENTOR.
PHILLIP G. PERRIN
BY
R. E. Geaugue
ATTORNEY United States Patent Office 2,952,954
Patented Sept. 20, 1960

2,952,954
PACKAGING MACHINE
Phillip G. Perrin, Sunland, Calif.
(4420 Meadowlark Lane, Santa Barbara, Calif.)
Filed Mar. 25, 1957, Ser. No. 648,086
47 Claims. (Cl. 53—35)

This invention relates generally to packaging machines and is concerned more particularly with machines or apparatus of the type wherein various articles are packaged in bags or envelopes. Specifically, the invention pertains to an automatic or semi-automatic machine for placing articles in an envelope type plastic bag and thereafter sealing the mouth of the bag to close the same and seal the articles therein.

The present machine or apparatus is adapted for packaging various forms of articles, particularly those of irregular shapes, in bags of various compositions. As an example the machine is suitable for packaging wire trouser hangers, such as illustrated in U.S. Patent No. 2,470,079, in polyethylene envelope-type bags. Perishable as well as non-perishable articles can be packaged in any desired shape and construction of bag best suited to protect and display the article and the bag can be closed after packaging by means best suited to the material, construction and shape of the bag. The term "article" as hereinafter employed is intended to include all objects capable of being packaged in bags.

It is an object of this invention to provide a packaging machine or apparatus which is highly practical and efficient in placing the articles in bags and sealing the latter to enclose the articles in a dust-proof, sanitary and attractive covering.

Another object of the invention is to provide a packaging machine in which is embodied suction-type positioning means for grasping a flat plastic bag, removing it from a stack of the bags and placing it in a loading position, bag-holding and opening means operative to enter the mouth of the positioned plastic bag to open the latter to a size and shape for receiving the articles and for holding the open bag in this position, and reciprocating loading means capable of receiving a plurality of the articles and inserting said articles into the bag through the open end thereof held by the bag-opening means, said loading means functioning to advance the loaded bag to an intermittently actuated sealing means which is operative to seal the open end of the bag together. In accordance with the invention, the various mechanisms of the machine are operated in sequence, each bag being filled engaging and ejecting the previously filled and sealed bag from the sealing station so that the articles and bags are operated upon and advanced through the machine in succession.

Another object of the invention is to provide an improved packaging machine, of the character referred to, in which the bag positioning means consists of a reciprocating suction head connected to vacuum means, said head being carried by the plunger of a pneumatic actuating cylinder, the machine in one embodiment utilizing an air jet directed into the empty bag to open the bag and in another embodiment, utilizing a movable top suction head to open the bag.

Another object of the invention is to provide a machine of the type indicated in which the bag opening means consists of a pair of elements of channel shape pivotally mounted for movement to an inoperative or retracted position in which they extend transversely of the path of movement of the articles to be inserted into the bags, and to an operative or extended position in which they extend substantially parallel and project into the mouth of the plastic bag held by the bag-positioned means so as to form the mouth into a rectangular shape for receiving the articles to be inserted into the bag. According to a feature and object of the invention, the channel-shaped bag-opening elements cooperate, when in their parallel, operative position, in providing a guideway through which the reciprocating article-loading means is guided to insert the articles into the bag.

Another object of the invention is to provide a machine or apparatus, of the class referred to, in which the article-inserting means consists of a pneumatic actuating cylinder having a piston or ram and rod, the latter carrying a flat holder upon which the articles are placed when the holder is in a retracted position, forward movement of the piston and holder through the guideway formed by the bag-opening elements carrying the articles into the plastic bag through the opened mouth thereof.

Another object of the invention is to provide a packaging machine of the type indicated which includes a pneumatic system embodying solenoid-actuated valves operable to control actuation of the bag-positioning means, the bag-opening and holding means, the article-inserting means and the bag-sealing means in predetermined sequence. The machine also includes electrical circuits in which the valve solenoids are connected and which embody limit switches actuated in response to movement of the article-inserting means in its forward and rearward directions, and to movement of the other parts, for controlling energization of said solenoids. According to the invention, operation of the machine through a complete cycle is initiated by the closing of a manually operable foot switch, the electrical circuit also including manually operable switch means for controlling actuation of the bag-positioning and -opening means, the latter means making it possible for the operator to effect operation of the bag-positioning and -opening means independently of the operation of the machine as a whole. Thus in the event of improper positioning and opening of a bag, the latter may be removed from the machine and operation of the bag-positioning and -opening means repeated to accurately place another bag in readiness to receive articles therein.

A further object is to provide a packaging machine which is relatively simple in construction, practical and efficient in operation, and one which is easily and quickly adjusted to adapt it for packaging articles in various size bags.

Further objects of the invention will appear from the following description and from the drawings which are intended for the purpose of illustration only, and in which:

Fig. 1 is a side elevational view of the present improved packaging machine or apparatus;

Fig. 2 is an enlarged plan view of the machine shown in Fig. 1;

Fig. 3 is an enlarged cross-sectional view, taken on line 3—3 of Fig. 1 and showing the supply of flat plastic bags and the bag-positioning means in its retracted position;

Fig. 4 is a vertical sectional view, taken on line 4—4 of Fig. 3 but showing the bag-positioning means in its extended position to pick up a flat bag from the supply stack;

Fig. 5 is an enlarged view of the lower portion of Fig. 4, illustrating the manner in which a bag is lifted into article-receiving position;

Fig. 6 is a longitudinal sectional view through the machine, showing the relation of the various elements at the completion of a bag-filling and sealing operation and just prior to return of the article inserting means to its inoperative position;

Figs. 7 and 8 are cross-sectional views, taken respectively on lines 7—7 and 8—8 of Fig. 1;

Fig. 9 and 10 are sectional views, taken respectively on lines 9—9 and 10—10 of Fig. 8;

Fig. 11 is a plan view of one of the two pivoted bag-opening and -holding elements and the pneumatically actuated operating means therefor;

Figs. 12, 13, and 14 are sectional views, taken respectively on lines 12—12, 13—13 and 14—14 of Fig. 11;

Fig. 15 is a sectional plan view, taken on line 15—15 of Fig. 13;

Fig. 16 is a cross-sectional view of the bag-sealing means, taken on line 16—16 of Fig. 1;

Fig. 17 is a vertical sectional view, taken on line 17—17 of Fig. 2;

Fig. 18 is a cross-sectional view of the bag-ejecting roller means, taken on line 18—18 of Fig. 1.

Fig. 18a is a cross-sectional view taken on line 18a—18a of Fig. 18.

Figure 21:
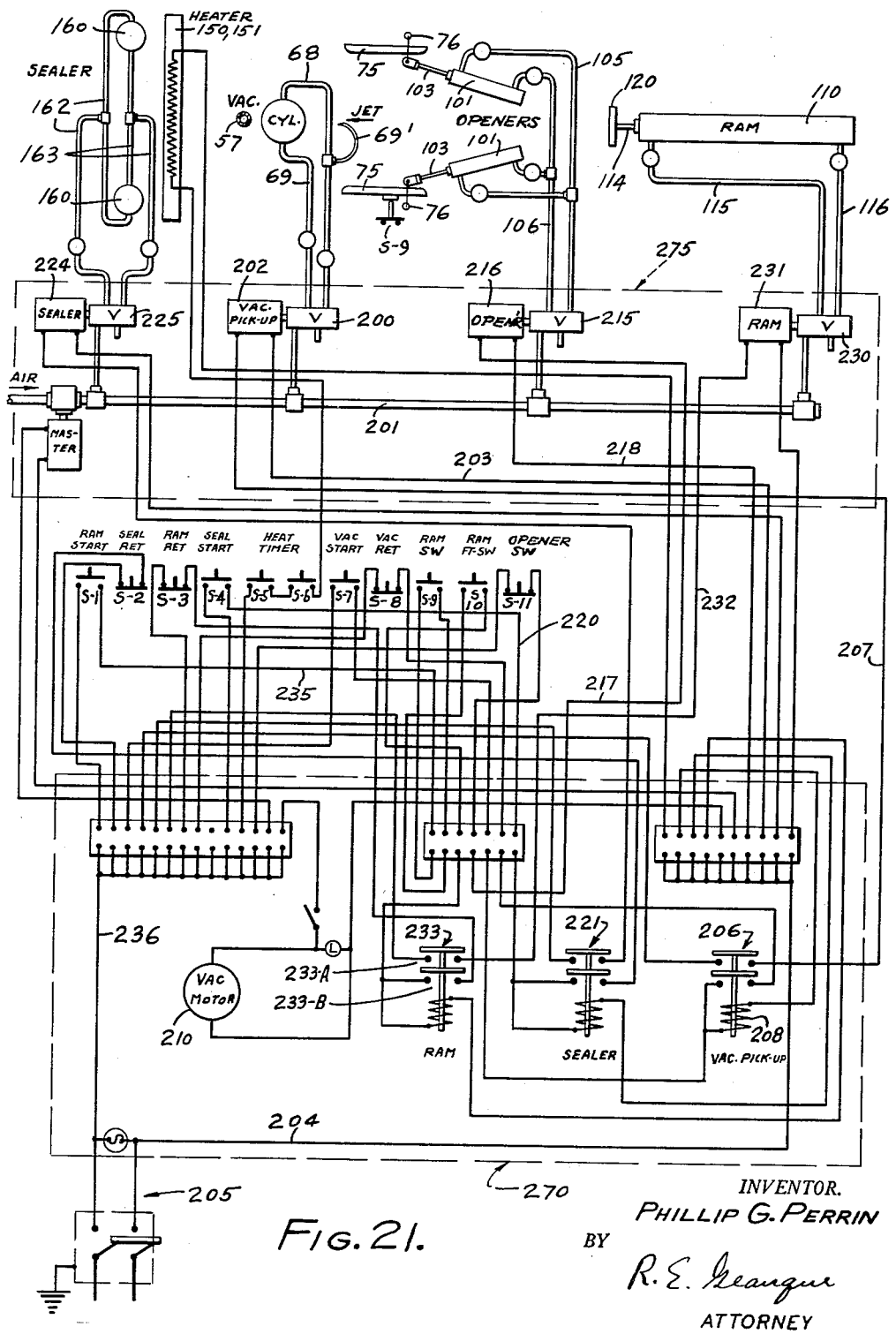
Figure 36:
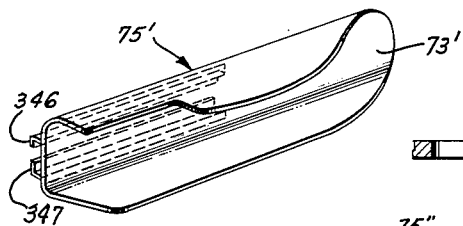
Figure 35:
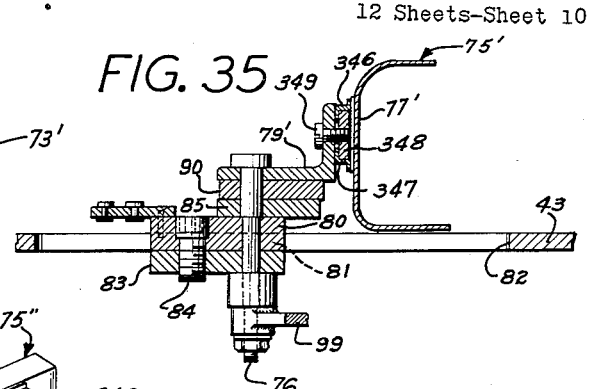
Figure 37:
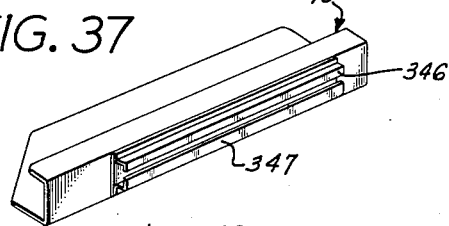
Figure 39:
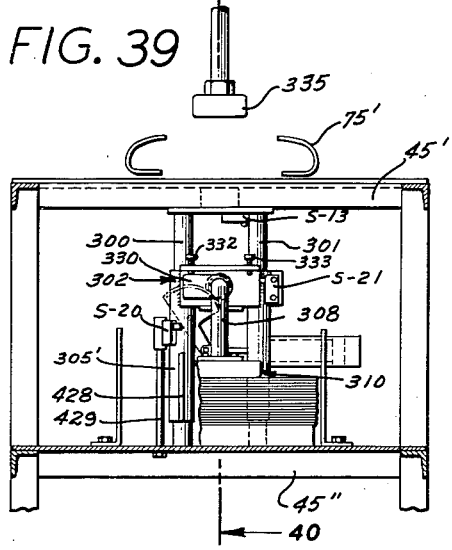
Figure 40:
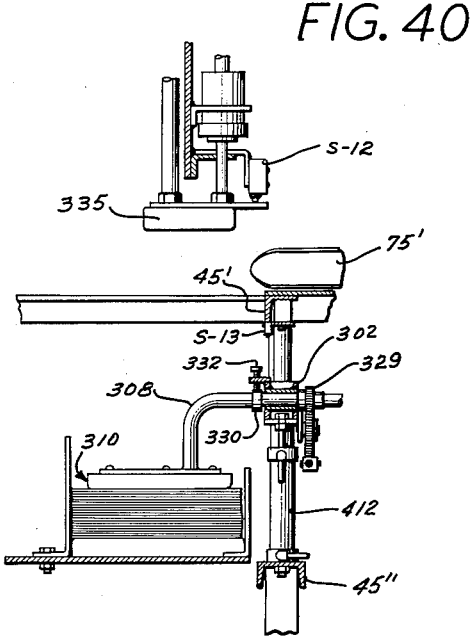
Figure 45:
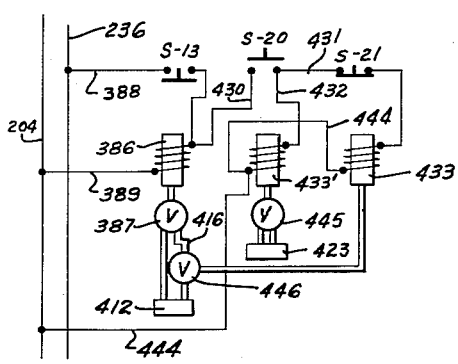

Fig. 19 is a perspective view of one of the plastic bags used in the machine;

Fig. 20 is a cross-sectional view through a bag and the trouser-hangers packaged therein;

Fig. 21 is a combined electrical, pneumatic flow and vacuum system diagram of the control for the packaging machine or apparatus;

Fig. 22 is a plan view similar to Fig. 2 illustrating a modification of the bag positioning means and heat sealing means;

Fig. 23 is a vertical section taken on lines 23—23 of Fig. 22 showing the bag gripping means adjacent the stack of empty bags;

Fig. 24 is a vertical section taken on lines 24—24 of Fig. 22;

Fig. 25 is an enlarged vertical section similar to Fig. 24 showing a bag held in opening position between the bag gripping means and a top suction head;

Fig. 26 is a vertical section of the bag positioning means, taken on lines 26—26 of Fig. 25 and showing the top suction head in its lower position;

Fig. 27 is a fragmentary view illustrating an intermediate position of the bag gripping means during its downward movement;

Fig. 28 is a fragmentary view illustrating an intermediate position of the bag gripping means during its upward movement;

Fig. 29 is a vertical section taken on lines 29—29 of Fig. 22 of modified heat-sealing means and bag holding means;

Fig. 30 is a sectional view of the modified bag holding means in closed position taken on lines 30—30 of Figure 22;

Fig. 31 is a top plan view of a second modification of the heat-sealing means wherein one of the sealing bars is rotated to close the end flap of the bag;

Fig. 32 is a vertical section taken on lines 32—32 of Fig. 31;

Fig. 33 is an enlarged fragmentary view similar to Fig. 32 showing the heat-sealing means in closed position;

Fig. 34 is a side elevational view of the empty bag utilized with the heat-sealing means of Fig. 31;

Fig. 35 is a vertical section similar to Fig. 12 of a modified bag opening element having means for longitudinally adjusting the position of the element;

Fig. 36 is a perspective view of the bag-opening element of Fig. 35;

Fig. 37 is a perspective view of a modified, adjustable bag-opening element of a different shape for loading a different shape of bag;

Fig. 38 is a schematic diagram of the control system for the modified forms of the invention illustrated in Figs. 22—38;

Fig. 39 is a sectional view similar to Fig. 23 of a modified form of mechanism for rotating and moving the lower suction head;

Fig. 40 is a view taken on line 40—40 of Fig. 39;

Fig. 41 is a view similar to Fig. 40 with an empty bag held between the suction heads;

Fig. 42 is a vertical section on line 42—42 of Fig. 41 showing the top suction head in its lower position;

Fig. 43 is a fragmentary view illustrating the intermediate position of the lower suction head during its upward movement;

Fig. 44 is a fragmentary view illustrating an intermediate position of the lower suction head at which it is held and fully rotated during its upward movement; and Fig. 45 is a partial diagram of the control system for the modification of Fig. 39.

The present packaging machine is particularly adapted for packaging articles of unusual or irregular shape. For example, the machine as disclosed in the drawings is designed for packaging wire trousers hangers H of the type illustrated in Figs. 2 and 20. Each hanger H has a pair of opposite arms 25 provided with loop portions 26 at their ends for engagement in the cuffs of a pair of trousers, the hanger also having a central stem 27 formed with a hook 28 at its free end. In preparing the hangers for shipment and sale, a plurality of the hangers are grouped in stacked relation with their hook portions 28 jointed by an encircling wire 29 (Fig. 20).

The group of hangers H are placed in a bag B of the type illustrated in Fig. 19. The bag is made from a thin, fusible, plastic material and has opposite panels 30 and gusset-type sides 31. The edges of one end 32 of the bag B are heat-sealed together at opposite sides of the center of this end, leaving a central opening 33. The other end of the bag is left open and provides a mouth 34 through which the group of hangers is inserted into the bag with the hook portions of the hangers projecting outwardly through the opening 33 as shown in Fig. 20. With the group of hangers H thus located within the bag B, the edges of the mouth 34 are brought together and heat-sealed by the application of heat and pressure, as indicated at 35 in Fig. 20, so as to close the bag and confine the portions 25, 26 of the hangers H therein. It is to be noted that the bags B are provided in a collapsed or flat condition (Fig. 6) and their mouth ends are later opened to receive the hangers H. As will be apparent from the following description, the present machine or apparatus is designed to perform automatically all of the steps necessary to prepare the bag for receiving a group of the hangers, inserting the hangers into the open end of the bag and subsequently sealing the mouth of the bag.

Referring to Figs. 1, 2 and 6, the machine includes a frame 40 having legs 41, the top of the frame having plates 42 and 43 which together provide a table-top or bed. These plates are spaced to provide a rectangular opening 44. Extending between side rails 45 of the frame 40 and located directly beneath the opening 44 is a plate 46 providing a platform upon which a stack of the flat plastic bags B is placed as shown in Figs. 1, 2 and 6. Vertical guide elements 47 on the platform 46 define a supply container 48 in which the stack of bags is held.

Means are provided for lifting the flat bags B successively from the supply container 48 and positioning them above the top 42, 43 of the frame, in position to receive the hangers H through their open ends. Referring to Figs. 3 to 6, a pair of upright bars 52 are mounted in brackets 53 carried at the sides of the frame 40. Extending between the bars 52, transversely of the frame 40, are cross members 54 which together support a vertical plate 55. The plate 55 carries bearing blocks 56 through which is slidable a vertical vacuum tube 57. The lower end of the tube 57 is screwed into a threaded hole in the top wall of a hollow head 60, the vacuum tube thus communicating with the interior of the head. As shown in Fig. 5, the lower wall of the vacuum head is provided with a plurality of holes 61. The upper end of the tube 57 is connected to a vacuum pump, not shown, by means of a hose 62.

Secured to the vertical plate 55 are the upper and lower ends of a pneumatic actuating cylinder 65 in which is slidable a piston 66. The lower end of the piston rod 67 is connected to the vacuum head 60 (Fig. 5). The opposite ends of the cylinder 65 are selectively connectible by lines 68 and 69 to a source of compressed air to actuate the vacuum head 60 through its working and return strokes, the introduction of air into the cylinder being controlled by valve means to be later described.

When the piston rod 67 is slid downwardly, the vacuum head 60 eventually engages the uppermost bag B of the stack. As the motion of the head 60 is reversed, suction created in the head and operating through the holes 61, acts to lift the upper bag B from the stack and carry the same upwardly to a position slightly above the plane of the top of the frame 40. During such upward movement of the bag B, the lower edge of its mouth end 34 wipes across the bristles of a stationary brush 68' (Fig. 5) to be separated downwardly away from the corresponding upper edge of the mouth. Thus, the mouth of the bag is opened. Upon reaching its upper position, said lower edge of the bag mouth is subjected to a stream of air directed thereagainst by a small nozzle 69' connected to the source of compressed air.

Upon reaching its upper position in readiness to receive the articles H, under the action of the positioning means 60, the bag B is gripped and held in article-receiving condition by means of a bag-opening and holding means constructed and arranged as next described. Referring particularly to Figs. 2, 6 and 11 to 15, a pair of bag opening elements 75 are pivoted on small vertical shafts 76 spaced transversely at opposite sides of the longitudinal center line of the machine (Fig. 2), at the side of the opening 44 nearest the loading end of the machine. As shown best in Figs. 11 and 12, each element 75 is, in effect, an arm of channel-shaped cross section having upper and lower flanges 75a and a vertical web 77. When in their retracted locations, the elements 75 assume the positions shown in Fig. 2. After the bag has been raised to article-receiving position, the elements 75 are pivoted toward the bag held by the vacuum head 60 (Fig. 11) and thus the elements are caused to enter the mouth of the bag and to positively open the plastic bag to cause it to assume a rectangular cross-sectional shape at its mouth portion as illustrated in Fig. 3. The bag thus is shaped and held in this condition to receive the articles H which are inserted into the bag by article-inserting means to be later described. When in their extended, operative position, the elements 75 provide between them a guideway for the article-inserting means.

Each element 75 has an ear 79 projecting laterally from its web 77, the ear being rotatable on the upper end of the shaft 76. Each shaft is rotatable in a bearing block 80 which, as shown in Fig. 13, has a reduced portion or key 81 disposed in a slot 82 formed in the plate 43 and extending transversely of the machine. A rectangular plate 83 is secured against the bottom of the block 80 by a screw 84 and extends beneath the top plate 43.

Interposed between the ear 79 and the bearing block 80 is a first lever 85 which is secured to the shaft 76 by a set screw 86, this lever having a recess 87 in its upper face. The lever has a lateral arm 88 having an upper projection or boss at its end, said boss carrying a screw 89.

Rotatable on the shaft 76 between the lever 85 and the ear 79 is a second lever 90. A locking screw 91 extends through a hole in the ear 79 and is screwed into a hole in the lever 90 to lock these parts together. The screw 91 has a reduced lug 92 at its lower end which is located within the recess 87. The lever 90 has a lateral arm 93 carrying a finger 94 through which is threaded a screw 95. Extending between the arms 88 and 93 is a compression spring 96, the ends of which are held by the screws 89 and 95 (Fig. 14).

Secured to the lower reduced end of each shaft 76 by a nut 98 is a lever-arm 99. Each plate 83 carries a pin 100 to which is pivoted one end of a pneumatic actuating cylinder 101. A piston 102 slidable in the cylinder 101 has a piston rod 103, the outer end of which is pivotally connected to the end of the lever arm 99. Lines 105 and 106 are connected to introduce pressure air selectively into the opposite ends of the cylinder 101.

When the pistons 102, 103 are simultaneously forced toward the left, as viewed in Fig. 11, the two lever arms 99 and the shafts 76 and plates 85 are rotated through part revolutions to swing the elements 75 away from each other to cause their free ends to enter the mouth of the plastic bag B held by the vacuum head 60. This pivotal movement is imparted to the elements 75 by reason of the springs 96 which act between the lever arms 88 and 93 to pivot the elements 75.

When full engagement of the elements 75 is effected, the arm 90 is restricted in its pivotal movement. At the same time, the arm 88 is moved through its full travel under the action of the piston rod 103 and lever-arm 99. Thus, the arm 88 contacts and closes the switch S-9 to complete the electrical circuit through the relay 233 to actuate the latter so as to allow energization of the main ram valve solenoid 231 and initiate operation of the carrier 120, when the foot switch S-10 is closed. The lost motion between the parts 88 and 93 thus provides a safety factor by preventing actuation of the ram 114 in the event that the bag being lifted to article-receiving position is wholly or partly released from the vacuum head 60 or is otherwise mal-placed, or in the event that the opener elements 75 fail to properly enter the positioned bag. When such conditions prevail, lever 90, which is integral with the element 75, is fully rotated and contact with the switch S-9 will not occur. Consequently, actuation of the ram 114 cannot be initiated unless the bag is properly positioned and the elements 75 enter the bag to open the same.

The article-inserting means is constructed and arranged as next described. Extending longitudinally of the machine is a pneumatic actuating cylinder 110, the ends of which are connected to angle-iron sections 111 and 112 fastened to the top plate 43 (Figs. 2 and 6). Slidable within the cylinder is a piston 113 having a piston rod or ram 114 which projects from the cylinder toward the bag-opening elements 75. Lines 115 and 116 are connected between the ends of the cylinder and the source of compressed air and serve to introduce pressure air selectively into the ends of the cylinder to actuate the piston in either direction.

Connected to the outer end of the piston rod 114 is a carrier 120 which, as shown in Fig. 6, has a shelf portion 121 upon which a group of the trouser hangers H are placed when the piston rod is in its retracted position. A backing plate 122 is carried by the shelf 121, this plate being of obtusely angular shape to adapt the angularly-related arms 25 of the hangers to fit snugly thereagainst (Fig. 2). When the piston rod 114 is forced outwardly toward the left as viewed in Fig. 2, the shelf 121 of the carrier 120 and the group of hangers H supported thereby are advanced into the mouth of the bag B held by the elements 75. Since the hooks 28 of the hangers project beyond the shelf 121, it follows that these joined hooks will be pushed through the opening 33 of the bag to project beyond the bag as illustrated in Figs. 6 and 20. During this forward movement of the article-inserting carrier 120, the carrier and hangers slide between the two channel-shaped, bag-opening elements 75 which together define a guideway for this purpose. It is to be noted at this point that the movement imparted to the carrier 120 is sufficient to cause the carrier to insert the hangers H in the bag B and to then strip the bag from the elements and carry the bag and its contents across the opening 44 (Fig. 6) to a bag-sealing means to be presently described. At this juncture, ejector roller means or resilient pressure pad acts to retain the bag and hangers unit so that as movement of the carrier 120 is reversed to restore it to its initial position, the carrier is simply withdrawn from the bag, leaving the latter in position to be sealed at its mouth end.

The carrier 120 is connected to the piston rod 114 by means of a bracket 126. Secured to this bracket are the forward ends of a pair of control rods 127 and 128. These rods are slidable through holes in the angle-iron 111 and extend to a point adjacent the rearward end of the cylinder 110 when the piston 113 is in its retracted position. Adjustably secured to the control rods 127 and 128, by means of binder screws 129, is a relatively heavy block 130 (Figs. 2 and 7) which serves as a counterweight to maintain the carrier in its horizontal plane of movement as it moves across the opening 44.

Mounted upon the top plate 43 and extending alongside the control rods 127, 128 are angle irons 135 and 136 which serve as supports for a series of electrical switches, to be later described, for controlling the action of various elements of the machine in proper sequence. Secured to the control rods 127 and 128, by binder screws 137, are follower blocks 138 and 139, these blocks having lateral arms 140 which overlie the switches. The arms 140 of the blocks 138 and 139 pivotally carry shoes 141 and 142 (Figs. 8 and 9) which when the carrier 120 is moved through its operative and return strokes, actuate the various switches in sequence. As shown in Fig. 9, the shoe 142 operates in one direction only, that is, during return movement of the carrier 120. During the operative stroke of the piston, the shoe 142 pivots as it rides across the actuator rollers of the switches. As seen in Figure 10, shoe 141 operates in a similar manner to shoe 142 except that the switch actuation occurs on the operative forward movement of carrier 120.

Referring now to Figs. 1, 6, 16, and 17, the means for heat sealing the plastic bag B includes an upper and a lower electrical heating element 150 and 151, these elements being in the form of bars extending transversely of the machine and arranged respectively above and below the horizontal path of movement of the filled bag B. As shown, the top plate 42 supports a pair of vertical rods or posts 152 which are held in place by nuts 153, the rods projecting above and below the plate. The rods extend through holes in lower plates 154 which carry the lower heating element 151 to slidably mount the latter, stop nuts 155 at the lower ends of the rods limiting downward sliding movement of this plate and element. The upper ends of the rods 152 also extend upwardly through holes in upper plates 156 which mount the upper heating element 150 to slidably support the latter. Coil springs 158 surround the rods 152 between the plate 42 and the element 150.

Also carried by the upper plates are pneumatic actuating cylinders 160 in which pistons 161 are slidable. Air lines 162 and 163 communicating with the upper and lower ends of the cylinder are selectively connectible to the source of compressed air. The pistons 161 have piston rods 164 which extend downwardly through holes in the top plate 42, the lower ends of the piston rods being connected to the plates 154 by means of nuts 165.

When pressure air is introduced into the lower ends of the cylinders 160, the pistons 161 are forced upwardly and the cylinders are forced downwardly with the upper assembly 160, 156, 150 moving downwardly. At the same time, the lower assembly 154, 151 is drawn upwardly. Thus, the heating elements 150, 151 are brought together against the action of the springs 158. As shown in Fig. 17, the elements 150, 151 grip the mouth portion of the bag B therebetween. When the elements are electrically energized, they serve to fuse the opposite sides of the plastic bag together so as to seal the bag and retain the hangers H therein.

As each filled bag B is advanced to the sealing means 150, 151, the hook portions 28 of the hangers H projecting from its end 32 are caused to move under a plurality of rollers 168 of soft material, such as sponge rubber (Figs. 1, 6, 17 and 18). The rollers 168 are carried by a transverse shaft 169, the ends of which are rotatable in vertical bearing plates 170 at the sides of the machine frame. The plates 170 are adjustably mounted against angle-irons 171 by means of bolts 172 passing through slots 173 in the plates. These rollers function by means of a ratchet device (see Fig. 18a) to detain the loaded bag at the sealing station and prevent the bag from being thrown from the machine by the carrier 120 which delivers the loaded bag to the sealer means. The ratchet device comprises a spring biased latch 169' carried by shaft 169 and coacting with an inner notched surface 170' at one end of the rollers, so that the rollers can rotate only in the clockwise direction as viewed in Fig. 1. As each filled bag is advanced to the sealer, the previously filled and sealed bag is pushed thereby under the rollers 168 and thence toward the left-hand delivery end of the machine. The filled bags or packages pass through a guide element 172' and 173' which may convey them to a loading station where they are placed in shipping cartons.

In the present machine, as illustrated in the drawings, the hanger units H are manually placed on the carirer 120 by an operator who may sit alongside the machine. If desired, the hanger units may be fed on to the carrier from a supply hopper 175 indicated by the broken lines in Figs. 1 and 6.

As will be apparent to one skilled in the packaging art, articles other than the hangers H may be packaged in bags by slight modifications in the various parts. Wider or narrower bags B may be used, in which case a different carrier 60 will be employed and the bag-opening elements 75 are adjusted toward or away from each other. In order to effect such adjustment, it is only necessary to loosen the screws 84 (see Figs. 12 and 13), slide the bearings 80 and plates 83 inwardly or outwardly in the slots 82 and then retighten the screws.

The present packaging machine may be regarded as automatic in operation, the various mechanisms performing their functions in sequence and each operation being initiated by electrical means controlled by movement of the cams on followers 140. The controls for the mechanisms involve electrical and pneumatic valve means and are arranged as next outlined.

Referring to the control diagram of Fig. 21, operation of the bag-positioning vacuum head 60 is, as explained above, controlled by actuation of the piston rod 67 as brought about by the introduction of pressure air into the ends of the cylinder 65 through the lines 68 and 69. These lines are connected to a two-way valve 200 which receives pressure air from a main air supply pipe 201. Actuation of the valve 200 is by means of a solenoid 202, one end of the coil of which is connected by wires 203 and 204 to one side of a power line 205. The other end of the coil is connected to one side of a relay switch 206 by a wire 207. Energization of the relay coil 208 is controlled by a normally-open switch S7 connected in series therewith. The switch S7 is of the snap action type and is adjustably mounted on the angle-iron 136 (Figs. 2 and 8) to adapt it to be actuated by the shoe 142 during return movement of the ram 114 to inoperative position.

Energization of the solenoid 202 serves to shift the movable element of the valve 200 to a position to effect flow of pressure air into the upper end of the cylinder 65 so as to depress the piston 66, rod 17 and vacuum head 60 against the topmost bag B of the stack of bags in the compartment 48. Vacuum is created in the line 57 and head 60 by means of a vacuum pump operated by an electric motor 210 (Fig. 21). When the head 60 reaches its lowermost position, it acts to compress the stack of bags and this action serves to open a normally-closed switch S8 located beneath the stack and connected in series with switch S7. By this action, the circuit to the valve solenoid 202 is broken so that the spring-actuated element of the air valve 200 is allowed to shift to a position which effects flow of pressure air into the lower end of the cylinder 65 through line 69 and exhaust of air from the upper end of said cylinder. Thus, the vacuum head 60 is raised to position the unfilled bag for receiving the articles as in Fig. 3.

Operation of the bag-opening and holding elements 75 follows completion of movement of the vacuum head 60 to its upper position. As shown the air lines 105, 106 of the cylinders 101 are connected to a two-way air valve 215 connected to the main line 201 and controlled by a solenoid 216. Connected in series with the solenoid coil, in a line 217, is a switch S11 which, as shown in Figs. 3, 4 and 6, is mounted on the cross member 54 to be engaged by the elevated vacuum head 60. The other end of the solenoid coil 216 is connected by a line 218 to the wire 204. Closing of the switch S11 effects energization of solenoid 216 so as to actuate the valve 215 in a manner such that pressure air is introduced into the rear ends of the cylinders 101 by way of the lines 106. By this operation, the elements 75 are swung to the position shown in Fig. 21 to open and hold the positioned bag. At a later stage, as the vacuum head 60 starts its descent, the switch S11 is opened to cause immediate retraction of the elements 75 by reason of pressure air entering the forward ends of the cylinders 101 through the lines 105.

After the bag B has been filled and is advanced into position between the heating elements 150 and 151 and as the ram 114 returns to its inoperative position, a normally-open switch S4 on the angle-iron 136 is actuated to closed position by the shoe 142. As shown in Fig. 21, the switch S4 is operative to close a line 220 leading through a relay switch 221. Connected in series with switch S4 is a normally-closed switch S2 which is mounted on the angle-iron 135 to be engaged by the shoe 141. Closing of the switch S4 effects energization of the solenoid actuator 224 of an air valve 225 connected to the air pipe 201 and adapted to control flow of air through the lines 162, 163 of the air cylinder 160.

When the switch S4 is closed, the valve 225 is actuated to admit pressure air into the lower ends of the cylinders 160 so as to bring the electric heating elements 150 and 151 together with the mouth of the bag B therebetween. As these elements approach each other, normally-open switches S5 and S6, connected in series and located at the lower element 151, are closed by plunger rods 226 carried by and movable with the upper element 150. Closing of these switches effects closing of the electric circuit through the heating elements 150 and 151 to cause them to fuse the sides of the bag mouth together and thus seal the bag B (Fig. 17). Now, as the ram 114 reaches its extent of return movement toward the right in Fig. 2, its shoe 141 acts to open switch S2 to break the circuit to the solenoid 224. The air valve 225 thus is permitted to shift to a position wherein pressure air is admitted to the upper ends of the cylinders 160 to restore the sealing elements 150, 151 to their inoperative, separated positions.

The means controlling movement of the ram 114 and carrier 121 includes a valve 230 connected to the air source 201 and operative to control flow of pressure air selectively into the ends of the ram cylinder 110. Actuation of this two-way valve 230 is controlled by a solenoid 231. A line 232 connects one end of the solenoid coil to one side 236 of the power line 205 and interposed in this line 232 is a relay switch 233. The other end of the solenoid coil 231 is connected to the side 204 of the power line. Connected in series in a line 235 are switches S1, S3, S9 and S10 and the other poles of the relay switch 233.

The switch S1 is located on the angle-iron 136 adjacent the rearward end thereof to be engaged by the shoe 142 as the ram 114 arrives at its rearmost, inoperative position. Normally-closed switch S3 is mounted on the angle-iron 135 toward the forward end thereof to be engaged by the shoe 141 as the ram reaches the extent of its forward movement. Switch S9 is carried by the arm 93 of the bag-opening mechanism and adapted to be closed by the arm 88 (Fig. 14). Switch S10 is a foot switch adapted for actuation by the operator of the machine.

By this arrangement of switches, when the ram 114 is in its fully retracted position (Fig. 2), switch S1 is closed, switch S9 is closed, switch S3 is closed, switch S10 is open and the coil of the relay switch 233 is de-energized to maintain both of its switches 233A and 233B open as indicated in Fig. 21. To start the operative stroke of the machine, the operator closes the foot switch S10. Current flow is then from the side 236 of the power line, through the switches S1, S9 and S10 and thence through the coil of the relay switch 233 to the side 204 of the line 205. The relay switches 233A and 233B are thus closed. Current flow is then established from 236, through switch 233A and solenoid 231 to 204.

The valve 230 thus is actuated to admit pressure air through line 116 into the rear end of the cylinder 110 so as to force the ram 114 and its carrier 120 forwardly. At the start of this forward movement, switch S1 is opened. However, since switch S3 is at this time closed, the circuit through the coil of the relay 233 remains closed and the solenoid 231 energized to continue the forward stroke of the ram. When the ram completes its movement in this direction, its shoe 141 engages switch S3 to open the same. The coil of the relay 233 thus is deenergized, whereupon solenoid 231 is also deenergized to cause the valve 230 to admit pressure air into the forward end of the cylinder 110 to return the ram and carrier 120 to initial position.

During this return movement, the various switches already described function to bring about retraction of the bag-opening elements 75, lowering of the vacuum head 60 and actuation of the heat-seal elements 150, 151.

It is thus seen that the machine is automatic in operation, it being only necessary to actuate the foot switch S10 to initiate the operative cycle. It will be apparent from the foregoing that articles of various sizes and shapes may be packaged in bags of suitable dimensions, in which cases the operative strokes of the various mechanisms may be adjusted in accordance with the requirements. For example, the forward stroke of the ram 114 is conveniently varied by simply adjusting the longitudinal position of the limit switch S3. The area of the bag receptacle 48 may be varied to accommodate bags of various sizes by adjusting the positions of the plates 47. As previously explained, the bag-opening and holding units 75, 101 are adjustable transversely to adapt them to operate on bags of different widths. The ejector rollers 168 are similarly adjustable. Referring to Figs. 1 and 2, the electrical elements are enclosed in a receptacle 270 having a control panel 271, this receptacle being preferably mounted upon the top of the machine frame. The air lines, valves, vacuum creating means, etc., are contained within a housing 275 also mounted on the machine frame, below the top 43 to provide a compact machine.

A modification of the bag gripping and opening means is illustrated in Figs. 22–28 wherein like reference numerals designate like parts as previously described. As in the previous embodiment, the frame 40 has legs 41 and top plates 42 and 43 are separated to provide opening 44. Extending between side rails 45 of the frame 40 is a plate 46' providing a platform upon which a stack of flat plastic bags B' is placed. Spaced cross members 45' and 45" extend between legs 41 at a location below the edge of plate 43 adjacent opening 44 and serve to support the bag gripping and positioning mechanism. The plate 46' is cut away at location 46" so as not to interfere with the bag gripping mechanism. Vertical guide elements 47 on the platform 46' define a supply container 48 in which the stack of bags is held.

The bag gripping and positioning means includes a pair of posts 300 and 301 which are spaced apart and secured between cross members 45' and 45". A slidable frame 302 extends between the posts and is comprised of two plates 303 and 304. Secured between the plates at opposite ends are sleeves 305 and 306 which are slidable on posts 300 and 301, respectively. Also, the plates have a center opening which receives a sleeve 307 for rotatably supporting passage 308 which connects at one end with vacuum tube 309. The other end of passage 308 is bent at right angles and terminates in a support plate 309 to which is attached a lower suction head 310. An opening 311 in the bottom of head 310 connects the interior space 312 of the head with the vacuum in passage 308 and the head has a plurality of openings 313 in the upper surface and in the curved end 314 thereof. One of the pneumatic cylinders 315 is secured between the lower edges of cross members 303 and 304 midway between posts 300 and 301 and the cylinder contains a piston 316 connected with rod 317. The lower end of rod 317 is secured to member 45" by lock nuts 318 so that the position of the rod is adjustable. Third pressure passages 319 and 320 are connected to opposite ends of the cylinder 315 for moving the cylinder up and down relative to the piston upon actuation of valve means to be later described. It is apparent that movement of the cylinder will cause movement of frame 302 and passage 308.

A pair of lugs 321 and 322 are secured to member 45' and 45", respectively, and extend to one side of the center line of cylinder 315. A rod 323 extends between the lugs and has one end secured to each lug by lock nuts so that the position of the rod is adjustable. Secured to the rod 323 are spaced collars 324 and 325 which can be adjusted along the rod and a gear rack 326 is slidably mounted on the rod between the collars. A coil spring 327 is interposed between collar 324 and rack 326 while a spring 328 is interposed between collar 325 and rack 328. The rack 326 is positioned to mesh with a pinion gear 329 carried by passage 308 at a location between sleeve 307 and vacuum tube 309. On the opposite side of sleeve 307 the passage 308 mounts a limit arm 330 to limit the rotation of passage 308 and head 310 by cylinder 315. A projection 331 is secured to the upper edge of plate 304 and mounts adjustable limit stops 332 and 333 above arm 330 and on opposite sides of passage 308. When the cylinder 315 is moved upwardly, the stop 333 will limit the rotation of arm 330 to position suction head 310 in its up position as illustrated in Figs. 25 and 26 and when the cylinder is moved downwardly, stop 332 will limit rotation of arm 330 to position the head in its down position as illustrated in Figs. 22–24.

In the up position, the cylinder 315 will be at the upper end of its stroke and the suction head 310 will be positioned horizontally in the plane of top plates 42 and 43, with the openings 313 on the upper side. When fluid is admitted to passage 320, the cylinder 315 will start downward. Referring to Fig. 27, an intermediate position of the head 310 and rack 326 during downward travel is illustrated and the down and up positions are shown in dashed lines. In the up position, the gear 329 is at the upper end of the rack and spring 327 is compressed. During the downward movement, the rack will travel upward relative to gear 329 and at the same time, downwardly relative to the frame. At the same time, the suction head 310 will be rotated. When the head becomes horizontal, no further rotation between the rack and gear can take place because of stop 332, and the rack 326 will compress spring 328 until the downward movement is stopped. As illustrated, the spring 328 is longer than spring 327 since spring 327 must be compressible over a greater distance for the reason that the height of stack B' will continually decrease during operation of the machine. At the end of the downward stroke, the gear 329 will be at the lower end of rack 326 (see Figs. 23 and 24).

In the down position, the head 310 is horizontally positioned with the openings 313 adjacent the top empty bag in stack B' and the vacuum in space 312 will cause the head to grip the top bag at openings 313. When fluid is admitted to passage 319, the cylinder 315 will start upward. Referring to Fig. 28, an intermediate position of head 310 and rack 326 during upward travel is illustrated and the down position is shown in dashed lines. During the upward movement, the rack will travel downward relative to gear 329 and at the same time, upwardly relative to the frame. Thus, the head can move bodily upwardly during its rotation and the rack will start to compress the spring 327. When the head becomes upright, no further rotation between the rack and gear can take place because stop 333 and the upward motion will terminate when the cylinder reaches the end of its stroke. A stop 334 is secured to the upper end of sleeve 305 and closes a limit switch S–14 mounted on cross member 45', when head 310 reaches its up position (see Fig. 26).

Each cycle of cylinder 315 will cause head 310 to pick up a single bag and position the bag along the plane of top plates 42 and 43 (see Fig. 26). While the head 310 is smaller in area than the bag, the head firmly grips the bag at suction openings 313. A reciprocating upper suction head 335 is utilized to grip the upper side of the bag and open the bag at mouth 34'. The head 335 is secured to piston rod 336 which is movable by a piston within cylinder 337 and the cylinder is rigidly secured to a frame 338 by means of brackets 339. The frame 338 can be secured to side rails 45 in any suitable manner in order to support cylinder 337. A vacuum passage 340 connects with interior space 341 of head 335 and the lower surface of the head contains opening 342 for gripping the upper panel of the bag when the head is in its down position. Switch S–12 is supported in fixed position by a bracket 343 attached to frame 338 and is actuated by an arm 344 secured at the end of piston rod 336 so that the switch closes when the head 335 is in its up position.

The sequence for gripping and opening an empty bag commences with the downward movement of head 310 from its up position. At its down position, the head 310 grips the top bag in stack B' and returns to its up position. Thereafter, suction head 335 moves downward from its up position and grips the upper side of the bag (see Fig. 26) and then returns to its up position to open the bag (see Fig. 25). Next, the bag opening elements 75' are moved by cylinders 101 from the position of Fig. 22 in order to insert and open the ends of the elements within mouth 34' of the bag and hold the mouth open to permit passage of carrier 120' between the elements and into the bag. The lip of the bag on the lower panel is held downward by opening 313 on curved end 314 and insures that the bag will be held clear of the elements 75' and carier 120'. Referring to Fig. 22, the carrier 120' comprises a flat shelf 121' and a straight backing plate 122'. The plate 122' is connected to the main ram 114 and to control rods 127 and 128. Also, a buffer plate 345 is supported by section 111 to cushion a carrier 120' at the end of its rearward stroke and can be adjusted along the length of ram 114. The shelf 121' can receive and support material of a wide variety of shapes and sizes.

Referring to Figs. 35–37, the elements 75' are operated by cylinders 101 in a same manner as the elements 75 of the prior embodiment. For instance, each element 75' is pivoted on a vertical shaft 76 and has an ear or bracket 79' rotatable on the upper end of shaft 76. Each shaft is rotatable in a bearing block 80 which has a reduced portion or key 81 disposed in slot 82 formed in plate 43 and extending transversely of the machine. As shown in Figs. 11–15, a rectangular plate 83 is secured against the bottom of block 80 by a screw 84 and extends beneath the top plate 43. Each plate 83 carries a pin 100 to which is pivoted one of a pneumatic cylinder 101 and the piston rods 103 of these cylinders connect with the end of a lever arm 99 attached to lower end of a shaft 76. The spring 96 serves to transmit the movement of arms 88 to arms 93 in order to transfer the movement of piston rods 103 into pivotal movement of elements 75'. When the ends of elements engage the sides of the bag and shape the sides to conform to the shape of the elements, the arms 93 are restricted in their pivotal movement. At the same time, the arms 88 move through its full travel to close switch S–9 on arm 93 and allow energization of the main ram valve and initiate operation of carrier 102', when the foot switch S–10 is closed. In the event an open bag is not positioned between suction heads 310 and 335 to receive the end of elements 75', the elements will continue to rotate with arm 88 so that closing of switch S–9 will not occur.

In the modification of Figs. 35–38, various widths of bags and various lengths and shapes of elements 75' may be utilized to conform with the shape and size of the article to be loaded on carrier 120' for packaging. As previously explained, the bag-opening elements 75' can be adjusted toward and away from each other by loosening screws 84 and sliding the bearings 80 and plates 83 inwardly or outwardly in the slots 82. In addition, the web 77' of elements 75' carry two spaced L-shaped brackets 346 and 347 which define a rectangular space for receiving a member 348 of approximately the same length as bracket 79'. Two screws 349, carried by bracket 79' pass through the space between brackets 346 and 347 and are threaded into spaced openings in member 348. Since the brackets 346 and 347 are substantially longer than member 348, the elements 75' can be adjusted lengthwise relative to bracket 79' and then secured in any selected position by tightening screws 349.

With the transverse adjustment provided by screw 84 the elements 75' can be positioned transversely of plate 43 to adjust for bag width and with the longitudinal adjustment provided by screws 349, the element 75' can be positioned to obtain maximum insertion into the bag when the elements are opened by piston rods 103 while at the same time limiting the length so that the elements will not engage each other in the closed position until they have cleared opening 44. Thus, for various bag sizes and element shapes, the position of the elements can be quickly adjusted to assure that the elements will properly engage the mouth of an open bag and conform it to the shape of the element. Referring to Figure 35, the web 77' of element 75' is curved to connect with the upper and lower flanges so that the sides of the bag, held open by the elements, will conform to this shape. In Figure 37 element 75" is of less height than elements 75 or 75' to open a bag having a narrow mouth for receiving relatively flat articles. The element 75" likewise has brackets 346 and 347 which receive member 348. Because of its square shape, the carrier 120' can be utilized to package a wide variety of articles, such as food, thread, etc.

After the articles have been inserted into the open bag by carrier 120', the continued movement of the carrier will strip the bag from elements 75' and move the bag and packaged articles onto platform 42. Upon return of the carrier 120' by the main ram, a modified bag retaining means is clamped on the bag to permit withdrawal of the carrier prior to sealing the open mouth of the bag. The bag retaining means comprises a soft pad 350 which is secured to the end of piston rod 351 attached to piston 352 in pneumatic cylinder 353. The cylinder is secured to a frame member 354 which is supported by a pair of rods 355 and 356 secured to plate 42, and working fluid is supplied to opposite ends of the cylinder through passages 357 and 358. Guide rods 355' and 356' are connected with pad 350 and slide in opening in frame member 354. In the up position of pad 350 (see Figure 29), suitable clearance for the packaged articles is provided on plate 42 and in the down position (see Figure 30) the pad will engage and hold the packaged articles. The material of the pad will have sufficient resiliency to retain the packaged articles without damage to the articles. As will be later described, the movement of pad 350 is controlled by the switches as the main ram so that the pad moves down when the ram reaches the end of its forward stroke and moves up after the ram has returned to its initial position.

While the bag is held by the pad 350 and during the return stroke of the main ram, the open mouth of the bag extends past the edge of plate 42 and over opening 44. A modified bag sealing means is illustrated in Figures 22 and 29 and comprises upper and lower electrical heating elements 150' and 151' in the form of bars extending transversely of the machine. The element 150' is supported above plate 42 by a pair of arms 359 pivotally attached at opposite edges of plate 42 by brackets 361. A pair of switch actuators 363 and 364 are secured to element 150' at its opposite ends. The element 151' is pivotally secured below plate 42 by spaced arms 365 pivotally attached to brackets 366 and the pair of switches S–5 and S–6 are carried by element 151' in position to engage actuators 363 and 364, respectively, when the elements are closed. One end of a piston rod 368 is pivotally attached to each arm 359 and the rod is connected to a piston 161' located in a pneumatic cylinder 160', which is attached to each arm 365. Openings 369 are provided in plate 42 for the rods 368. A spring 369 is located between each arm 359 and plate 42 in order to bias the arm in an upward direction and a pin 370 is carried by each arm 365 to engage plate 42 and limit the upward movement of the arms 365. Air lines 162 and 163 connect with opposite ends of cylinders 160' and when air is admitted to line 162, the arms 365 and cylinders 160' move upward until pins 370 engage plate 42. Thereafter, arms 359 are pulled downward against the force of spring 369 to bring heating elements 150' and 151' together at the mouth of the filled bag. Upon closing of the heat sealing elements, the series connected switch S–5 and S–6 are closed to cause electric current to pass through one or both of the heating elements in order to fuse the sides of the bag together at the mouth of the bag. The actuation of cylinder 160' can be under the control of switches S–2 and S–4 as in the previous embodiment. It is understood that the face of the heating elements can carry a conducting ribbon which is heated by current passing therethrough. Since the pins 370 are adjustable, the location relative to plate 42 at which the elements come together, can be adjusted. As illustrated in Figure 22, each corner of plate 42 carries a fastening bolt 371 which extends through a groove 372 in a side rail 45 so that the position of the elements 150' and 151' can be adjusted longitudinally relative to the frame.

Another modification of the heat sealing means is illustrated in Figures 31–33. The cylinders 160" are secured to the upper surface of plate 42 at opposite edges of the plate and each of the piston rods 368 extends along the machine and connects with the end of a chain 373. A pair of projections 374 are secured at opposite sides of plate 42 and extend into opening 44. Each projection rotatably mounts a shaft 375 to which is secured a sprocket 376 and a circular mounting member 377. Each of the members 377 contains a notch 378 having a surface to which sealing element 150" can be secured in position transverse of the machine. Each of the chains 373 passes over a sprocket 376 and connects with one end of a spring 379 located underneath each cylinder 160". The other end of each spring is connected to a hook 380 connected with a bracket 381 attached to the under surface of plate 42. The springs 379 serve to maintain tension on chains 373 so that the element 150" will move with piston rod 368'. A plate 382 is secured to the lower surface of plate 42 and extends into opening 44 to mount the second sealing element 151" transversely across the opening at the location of the mouth of an unsealed, filled bag.

In this second modification, the action of cylinder 160" can also be controlled by switches S-2 and S-4. Switches S-5 and S-6 are secured to the upper surface of plate 42 in position to be closed by arms 383 carried by element 150", when the elements are closed to seal the mouth of a filled bag. Referring to Figure 33, the filled bag is retained by pad 350 and the lower panel of the bag extends past the mouth and lies on element 150" when the elements are open, (see the dashed line position of the lower panel on element 150"). When cylinder 160" is actuated to close the elements, the chain 373 will rotate element 150" and at the same time, the lower panel of the bag will be folded over upon the top panel. After the elements are closed, the switches S-5 and S-6 will be actuated to heat seal the panels of the bag together and close the mouth of the bag (see full line position of the panels and element 150" in Fig. 33). Thus, the modification of Figures 31-33 is particularly suited to the sealing of bags which require folding of a part of the bag.

It is understood that in all modifications of the heat sealing means, the impulse type of sealer can be replaced with sealers in which one or both of the elements are continuously hot. This latter type of hot bar sealer is particularly suited to the sealing of cellophane bags while the impulse type of seal is more effective for the sealing of polyethylene bags. It is also apparent that other bag sealing means such as those which rely upon glue or self sealing properties, can be utilized in place of heating elements.

The operation of the modified form of the invention shown in Figures 22-38 will now be described and it is understood that the heat-sealing means of Figure 29 or Figure 31 can be interchangeably incorporated in this modification without change in circuitry or sequence of operation. For the purpose of description, the heating-sealing means of Figure 29 will be referred to. The circuitry for operation of the modification contains switches S-1 through S-6, S-9 and S-10 for controlling the same components in the manner illustrated in Figure 21. However, switches S-7, S-8 and S-11 which controlled the suction head 60 and elements 75 of the prior embodiment have been replaced by the switches and circuit shown in Figure 38 in order to control the movement of suction heads 310, 335 and elements 75'. Also, another switch 233C is shown attached to relay 233 to control the operation of cylinder 353.

When the ram 114 arrives at its rearmost position, the switches S-1 and S-3 on angle-iron 136 and switch S-9 on arm 93 of the bag-opening mechanism are closed and thereafter closure of foot swtch S-10 will energize relay 233 to start the ram forward. At the start of this forward movement, switch S-1 is opened. However, since switch S-3 is at this time closed, the circuit, through relay 233 remains closed until the switch S-3 is opened at the end of the stroke.

At the start of the forward movement, an empty bag will be held between suction head 310 and 335 in the manner illustrated in Figure 25. On the previous forward stroke, the carrier 120' has loaded an empty bag and moved it on to plate 42, and the suction openings in heads 310 and 335 have been uncovered by the opening of elements 75'. Upon uncovering of the openings 313 in suction head 310, the head will be rotated and moved downwardly by cylinder 315 until the head engages the top bag of stack B'. Referring to Fig. 38, a switch S-13 is actuated by a diaphragm 385 in communication with vacuum passage 309 connected with suction head 310. When the openings 313 are uncovered, the diaphragm opens switch S-13 positioned between power lines 204 and 236 and deenergizes solenoid 386 and moves valve 387 into position to move cylinder 315 downwardly. When the head 310 engages stack B', the opening 313 will be covered by the top bag to recreate the vacuum in passage 309 and at the same time, the head will grip the top bag. The vacuum in line 309 will cause diaphragm 385 to close switch S-13 and thereby energiez solenoid 386 through lines 388 and 389 and move valve 387 into position to cause cylinder 315 to move upwardly. This upward movement will continue to the end of the stroke and will rotate head 310 and the empty bag attached thereto. Thus, the head 310 and empty bag will remain in the up position until the bag is energized by elements 75' at which time the cycle will be repeated.

After the lower head 310 is in the up position, the upper suction head 335 will move downwardly to grip the upper panel of the empty bag. Prior to this downward movement of head 335, the vacuum in passage 340 will be absent and diaphragm 390 will maintain switch S-16 closed. At the same time, switch S-14 will be closed by arm 334 which moves with lower head 310 and switch S-15 (see Figure 22) will be closed since the cylinder 101 has moved inwardly while closing the elements 75'. Since the switches S-14, S-15 and S-16 are in series in lines 391 and 392, the closing of switch S-14 will actuate solenoid 393 to move valve 394 and energize cylinder 337 to move head 335 downwardly. When the openings 342 in head 335 grip the upper panel of the bag held by head 310, the vacuum will return to line 340 and diaphragm 390 will open switch S-16 to move valve 394 and return head 335 to its up position. At the same time, the return movement will open the bag into the position illustrated in Figure 25, and the heads will continue to hold the bag until elements 75' move into the mouth of the bag to hold it open. Thus, upper head 335 will move down and up each time the lower head 310 is in up position and the elements 75' are closed.

The movement of elements 75' by cylinder 101 is also controlled by the vacuum in passage 340. A diaphragm 395 communicates with passage 340 and closes switch S-17 when the head 335 is in its up position and gripping an empty bag so that low pressure is present in passage 340. Also, when the head 335 is in the up position, switch S-12 will be be closed by arm 344 carried by the head. The switches S-12 and S-17 are connected in series with relay 398 between lines 396 and 397 so that the relay is actuated when both switches are closed. Actuation of relay 398 will close contact 400 to connect line 397 with line 401 which contains switch S-7' located on angle-iron 136 in the same position as with S-7 for the prior embodiment. The switch S-7' is normally closed so that during the return movement of the ram 114, a holding circuit for relay 398 will be present. The relay will also close contact 402 in order to connect solenoid 403 to the power source through lines 404 and 405 and solenoid 403 will operate valve 406 to cause the cylinder 101 to open the elements 75' into the mouth of the bag held between suction head 310 and 335. This action will remove the bag from the heads and will result in loss of vacuum in lines 309 and 340. Thereafter, lower suction head 310 will move through its cycle to pick up another empty bag and again close switch S-14. However, switch S-15 will be opened by movement of the cylinder 101 so that the upper suction head 335 cannot move downwardly until the elements 75' are again in closed position.

As the ram 114 nears its rearward position, the switch

S-7' will be opened to open the holding circuit through lines 397 and 401 for relay 398 and valve 406 will cause cylinders 101 to move the elements 75' into their closed positions. Switch S-15 will then be closed and the lower suction head 310 will have completed its cycle to position a new empty bag in the up position and close switch S-14. Thus, the upper suction head will be moved through its cycle again and switch S-12 will be closed to energize relay 398 and again open the elements 75'. This action is controlled automatically by the amount of vacuum in lines 309 and 340 and takes place as the ram moves rearwardly and closes switch S-1 to stop the ram. When the ram is stopped, the elements 75' will be open and switch S-9 (see Figure 11) will be closed. Thus, the closing of manual switch S-10 will cause the ram to move forward since switches S-1, S-3, S-9 and S-10 are in series, as illustrated in Figure 21, to control valve 230 through relay 233.

In summary, the action of lower suction head 310 takes place upon opening of the elements 75' and the action of the upper head 335 takes place after opening of switch S-7' to close the elements 75'. Thereafter, the elements 75' automatically open and hold the open bag in position to be filled when the manual switch S-10 is closed. Thus, there is no opportunity for the upper head to engage the elements 75' or the carrier 120'.

The cylinder 160' is actuated by switches S-2 and S-4 in the same manner as cylinder 160 of the prior embodiment. After the bag has been filled and advanced into position between the heating elements 150' and 151', the ram 114 returns to its inoperative position. During its return, switch S-4 is closed to activate relay 221 and cause solenoid 224 to move valve 225 into position for closing of the heating elements by cylinder 160'. Upon closing of the heating elements at the mouth of the filled bag, the series switches S-5 and S-6 will be closed by actuators 363 and 364 (see Fig. 22) to energize the electrical heating circuit of one or more heating means carried by the heating elements, to seal the panels of the bag together. As the ram 114 reaches its rearward position, the switch S-2 is opened to break the circuit to solenoid 224 and cause cylinder 160' to return the heating elements to the open position. The circuit for actuation of the cylinder 160' and the heating elements is the same as in Figure 21 and, as previously mentioned, the cylinder 160" will be actuated in the same manner if the heating elements of Figure 32 are utilized in place of the heating elements of Figure 29.

The action of holding pad 350 is controlled by the same switches S-1, S-3, S-9 and S-10 as the main ram 114 so that the pad is in the up position upon actuation of manual switch S-10 to start the forward movement of the ram and moves to the down position when switch S-3 is actuated to return the ram. As illustrated in Figure 38, the relay 233' is identical with the relay 233 of Figure 21 except that switch 233C has been added for controlling cylinder 353. The switch 233C is opened upon actuation of switch S-10 to close switches 233A and 233B. The opening of switch 233C de-energizes solenoid 408 and positions valve 409 to maintain pad 350 in the up position. Actuation of switch S-3 to return the ram, will close switch 233C and energize relay 408 through lines 410 and 411 in order to move valve 409 and cause cylinder 353 to hold pad 350 in the down position against the filled bag in plate 42. Since the reversal of the ram is not instantaneous the pad will have time to grip the filled bag before carrier 120' starts to move out of the bag. Also, the pad 350 will be in the up position during the forward movement of the ram to permit the filled and sealed bag to be moved along plate 42 by the filled bag being moved into position for sealing.

A modification of the mechanism for moving the lower suction head 310 is illustrated in Figures 39-44. The pair of posts 300 and 301 are spaced apart and are secured between cross members 45' and 45". A slidable frame 302 extends between the posts and is comprised of two plates 303 and 304. Secured between the plates at opposite ends are sleeves 305' and 306' which are slidable on posts 300 and 301, respectively. Also, the plates have a center opening which receives a sleeve 307 for rotatably supporting passage 308 which connects at one end with vacuum tube 309. The other end of passage 308 is bent at right angles and terminates in a support plate 309 to which is attached lower suction head 310. An opening 311 in the bottom of head 310 connects with the interior space 312 of the head with the vacuum in passage 308 and the head has a plurality of openings 313 in the upper surface and in the curved end 314 thereof.

A cylinder 412 has one end secured to member 45' and contains a piston 413 connected with rod 414. The end of rod 414 is secured to cross members 303 and 304 in order to move frame 302 and head 310 up and down on posts 300 and 301 when working fluid is admitted to the cylinder through either passage 415 or 416. A pinion gear 329 is secured to passage 308 between frame member 302 and passage 309 in order to cause rotation of suction head 310 during either up or down movement. A bracket 417 is secured to sleeve 305' and extends rearwardly to pivotally support gear sector 418 by pin 419 in position to mesh with pinion gear 329. The end 420 of sector 418 is pivotally connected to the end of piston rod 421 which is moved by a piston 422 in cylinder 423. One end of cylinder 423 is pivotally connected by pin 424 to a bracket 425 which is secured to sleeve 306' and extends rearwardly, so that the cylinder can pivot in the same place as the sector 418. Air lines 426 and 427 are connected to opposite ends of cylinder 423 and the cylinder serves to rotate the head 310. The lower portion of sleeve 305' forms a cam 428 for actuating a limit switch S-20 which is supported on rod 429 secured to member 45' (Fig. 39). The switch S-20 is located in position to be closed during the time the frame 302 and head 310 are between an intermediate position and the up position, the switch being open when frame 302 is between the intermediate position and down position.

On the opposite side of sleeve 309, the passage 308 mounts a limit arm 330 to limit the rotation of passage 308 and head 310 by cylinder 423. A projection 331 is secured to the upper edge of plate 304 and mounts adjustable limit stops 332 and 333 on opposite sides of passage 308 and above arm 330. When the cylinder 412 is actuated to move the head 310 upwardly, the cylinder 423 will move rod 421 outwardly to rotate the head clockwise as viewed in Figure 42 until arm 330 engages stop 333 and the head is in upright, horizontal position. A switch S-21 is carried by a bracket secured to plate 304 and the switch is located in position to be held open by the rounded end of arm 330 as the arm moves into engagement with stop 333.

Referring to the circuit to Figure 45, the vacuum switch S-13 controls the solenoid 386 in lines 388, 389 to operate valve 387 in the same manner as in Figure 39. The valve 387 controls cylinder 412 to move the head 310 downwardly when the switch S-13 is open and vacuum is not present in passage 309. When vacuum returns after the head grips an empty bag, the solenoid will be energized to move head 310 upwardly. A line 430 contains the switch S-20 and is connected through the switch with lines 431 and 432. The line 431 connects with solenoid 433 and contains switch S-21. Line 432 connects with solenoid 433' and both solenoids are connected to the power source by line 444. When the vacuum is broken in line 309 and switch S-13 opens, switches S-20 and S-21 will be open. However, since S-13 is open, solenoid 433' will move valve 445 to cause cylinder 423 to move rod 421 inwardly and rotate head 310 until arm 330 engages stop 332. At the same time, the head 310 is moved downwardly by cylinder 412. The initial rotation of arm 330 will cause switch S-21 to close and switch S-20 will open after the frame 302 passes the intermediate position in its downward movement.

When the head 310 grips an empty bag in stack B', switch S-13 will be closed by the vacuum developed in 309 and the cylinder 412 will start to move the frame 302 upward. When the intermediate position is reached and head 310 has cleared the container for stack B', the switch S-20 will be closed by cam 428 and solenoid 433' will be energized to cause cylinder 423 to rotate head 310. At the same time, switch S-21 will be closed to energize solenoid 433. This solenoid operates a valve 446 located in line 416 which exhausts cylinder 412 during upward movement of head 310. The solenoid 433 will close valve 446 and thus, stop the upward movement of head 310 while the head is rotated. At the end of the rotation, arm 330 will open switch S-21 as it engages stop 333 and solenoid 433 will move valve 446 to open line 416 so that head 310 will be moved upwardly by cylinder 412 to the end of its stroke. Since switch S-20 will remain closed, the cylinder 423 will continue to hold the head upright. The suction head 310 is now in condition to commence another cycle.

The embodiment of the bag gripping and moving means just described has the advantage that positive control is maintained over the rotation of the lower suction head and no rotation of the head can take place until the head is clear of other components of the machine.

The present invention also provides a novel method in which empty bags are picked up from a stack and automatically opened by gripping the exterior of the bag, then inserting means within the bag to positively hold the bag open, then inserting articles into the open end of the bag and moving the bag to a sealing position and thereafter sealing the bag. It is understood that the present invention can package various sizes and shapes of articles constructed of a wide variety of materials. The chute elements can be shaped and adjusted in position to handle various sizes and types of bags and any suitable type of closing or sealing unit can be utilized, depending upon the type of sealing desired. Various other modifications are contemplated by those skilled in the art without departing from the spirit and scope of the invention as hereinafter defined by the appended claims.

I claim as my invention:

1. A packaging machine for packaging articles in a heat-sealable bag having a mouth end, comprising: a frame provided with a compartment for containing a stack of flat, heat-sealable bags; a bag-positioning means reciprocable in a path normal to the plane of each flat bag and operative to transfer a bag from the stack to a position remote therefrom; means on the frame operative to partially open the mouth of the transferred bag; movable bag-opening and -holding elements operative, when extended in one direction, to enter the party-opened mouth of the positioned bag so as to fully open and shape the mouth for the reception of articles therein, said elements together defining a guideway therebetween when they are in their extended, substantially parallel position; a carrier reciprocable on the frame and adapted to support articles for insertion into the positioned bag, said carrier being movable in one direction through said guideway into the positioned bag so as to insert the articles thereinto, and being operative to strip the bag from said elements and to advance the bag and its contents to a sealing station; means engageable with the bag so advanced to retain the same at said station, said carrier being movable in the opposite direction to cause it to be withdrawn from the advanced bag; heat-sealing means at said station operative to fuse the sides of the bag mouth together; operating means for actuating said bag-positioning means, said bag-holding elements, said carrier and said heat-sealing means; and control means for effecting operation of said operating means in sequence.

2. A packaging machine for packaging articles in a heat-sealable bag having a mouth end, comprising: a frame provided with a compartment for containing a stack of flat, heat-sealable bags; a bag-positioning vacuum means reciprocable in a path normal to the plane of each flat bag and operative to transfer a bag from the stack to a position remote therefrom; means on the frame operative to partially open the mouth of the transferred bag; movable bag-opening and -holding elements operative, when extended in one direction, to enter the partly-opened mouth of the positioned bag so as to fully open and shape the mouth for the reception of articles therein, said elements together defining a guideway therebetween when they are in their extended, substantially parallel position; a carrier reciprocable on the frame and adapted to support articles for insertion into the positioned bag, said carrier being movable in one direction through said guideway into the positioned bag so as to insert the articles thereinto, and being operative to strip the bag from said elements and to advance the bag and its contents to a sealing station; means engageable with the bag so advanced to retain the same at said station, said carrier being movable in the opposite direction to cause it to be withdrawn from the advanced bag; heat-sealing means at said station operative to fuse the sides of the bag mouth together; operating means for actuating said bag-positioning means, said bag-holding elements, said carrier and said heat-sealing means; and control means for effecting operation of said operating means in sequence.

3. A packaging machine for packaging articles in a heat-sealable bag having a mouth end, comprising: a frame provided with a compartment for containing a stack of flat, heat-sealable bags; a bag-positioning vacuum means reciprocable in a path normal to the plane of each flat bag and operative to transfer a bag from the stack to a position remote therefrom; air jet means on the frame operative to partially open the mouth of the transferred bag; movable bag-opening and -holding elements operative, when extended in one direction, to enter the partly-opened mouth of the positioned bag so as to fully open and shape the mouth for the reception of articles therein, said elements together defining a guideway therebetween when they are in their extended, substantially parallel position; a carrier reciprocable on the frame and adapted to support articles for insertion into the positioned bag, said carrier being movable in one direction through said guideway into the positioned bag so as to insert the articles thereinto, and being operative to strip the bag from said elements and to advance the bag and its contents to a sealing station; means engageable with the bag so advanced to retain the same at said station, said carrier being movable in the opposite direction to cause it to be withdrawn from the advanced bag; heat-sealing means at said station operative to fuse the sides of the bag mouth together; operating means for actuating said bag-positioning means, said bag-holding elements, said carrier and said heat-sealing means; and control means for effecting operation of said operating means in sequence.

4. A packaging machine for packing articles in a heat-sealable bag having a mouth end, comprising: a frame provided with a compartment for containing a stack of flat, heat-sealable bags; a bag-positioning vacuum means reciprocable in a path normal to the plane of each flat bag and operative to transfer a bag from the stack to a position remote therefrom; means on the frame operative to partially open the mouth of the transferred bag, said means including brush bristles positioned to engage the trailing edge of the mouth of the bag being transferred so as to displace the same from the leading edge of the bag, and an air jet nozzle for directing a stream of air against said trailing edge of the positioned bag; movable bag-opening and -holding elements operative, when extended in one direction, to enter the partly-opened mouth of the positioned bag so as to fully open and shape the mouth for the reception of articles therein, said elements together defining a guideway therebetween when they are in their extended, substantially parallel position; a carrier reciprocable on the frame and adapted to support articles for insertion into the positioned bag, said carrier being movable in one direction through said guideway into the positioned bag so as to insert the articles thereinto, and being operative to strip the bag from said elements and to advance the bag and its contents to a sealing station; means engageable with the bag so advanced to retain the same at said station, said carrier being movable in the opposite direction to cause it to be withdrawn from the advanced bag; heat-sealing means at said station operative to fuse the sides of the bag mouth together; operating means for actuating said bag-positioning means, said bag-holding elements, said carrier and said heat-sealing means; and control means for effecting operation of said operating means in sequence.

5. A packaging machine for packaging articles in a heat-sealable bag having a mouth end, comprising: a frame provided with a compartment for containing a stack of flat, heat-sealable bags; a bag-positioning means reciprocable in a path normal to the plane of each flat bag and operative to transfer a bag from the stack to a position remote therefrom; means on the frame operative to partially open the mouth of the transferred bag; a pair of bag-opening and holding elements pivotally mounted on the frame for pivotal movement in a plane normal to the path of movement of said bag-positioning means, said elements being operative, when pivoted in one direction to an extended position, to enter the mouth of the positioned bag so as to fully open and shape the mouth for the reception of articles to be inserted therein, said elements together defining a guideway therebetween when they are in their extended, substantially parallel position; a carrier reciprocable on the frame and adapted to support articles for insertion into the positioned bag, said carrier being movable in one direction through said guideway into the positioned bag so as to insert the articles thereinto, and being operative to strip the bag from said elements and to advance the bag and its contents to a sealing station; means engageable with the bag so advanced to retain the same at said station, said carrier being movable in the opposite direction to cause it to be withdrawn from the advanced bag; heat-sealing means at said station operative to fuse the sides of the bag mouth together; operating means for actuating said bag-positioning means, said bag-holding elements, said carrier and said heat-sealing means; and control means for effecting operation of said operating means in sequence.

6. A packaging machine for packaging articles in a heat-sealable bag having a mouth end, comprising: a frame provided with a compartment for containing a stack of flat, heat-sealable bags; a bag-positioning means reciprocable in a path normal to the plane of each flat bag and operative to transfer a bag from the stack to a position remote therefrom; means on the frame operative to partially open the mouth of the transferred bag; a pair of bag-opening and holding elements pivotally mounted on the frame for pivotal movement in a plane normal to the path of movement of said bag-positioning means, said elements being operative, when pivoted in one direction to an extended position, to enter the mouth of the positioned bag so as to fully open and shape the mouth for the reception of articles to be inserted therein, said elements being of channel shape and together defining a guideway therebetween when they are in their extended, substantially parallel position; a carrier reciprocable on the frame and adapted to support articles for insertion into the positioned bag, said carrier being movable in one direction through said guideway into the positioned bag so as to insert the articles thereinto, and being operative to strip the bag from said elements and to advance the bag and its contents to a sealing station; means engageable with the bag so advanced to retain the same at said station, said carrier being movable in the opposite direction to cause it to be withdrawn from the advanced bag; heat-sealing means at said station operative to fuse the sides of the bag mouth together; operating means for actuating said bag-positioning means, said bag-holding elements, said carrier and said heat-sealing means; and control means for effecting operation of said operating means in sequence.

7. A machine as defined in claim 6 in which said bag-positioning means includes: a fluid actuating cylinder, piston and piston rod therefor arranged with their common axis extending normal to the plane of each of the stacked, flat bags; a hollow head carried at the free end of the piston rod and having holes in a face thereof, the interior of said head communicating with a suction-producing means; and valve-controlled means for alternately introducing pressure fluid into the opposite ends of the cylinder to reciprocate said head.

8. A machine as defined in claim 6 in which said bag-opening and -holding means includes the elements of channel shape; means operatively connecting the elements to piston rods of fluid-actuated cylinders to be pivoted thereby; and valve-controlled means for introducing pressure fluid alternately into the opposite ends of the cylinders.

9. A machine as defined in claim 6 in which said bag-opening and -holding means includes the elements of channel shape; means operatively connecting the elements to piston rods of fluid-actuated cylinders to be pivoted thereby; and valve-controlled means for introducing pressure fluid alternately into the opposite ends of the cylinders, said elements and their actuating cylinders being adjustable as units toward and away from each other in accordance with the width of the bag to be filled.

10. A machine as defined in claim 6 in which said carrier includes: a flat plate upon which the articles are placeable, said carrier being carried at the free end of a piston rod having a piston slidable in a fluid actuating cylinder arranged with its axis normal to the path of movement of said bag-positioning means; and valve-controlled means for introducing pressure fluid alternately into the opposite ends of the cylinder to reciprocate said carrier.

11. A machine as defined in claim 6 in which said carrier includes: a flat plate upon which the articles are placeable, said carrier being carried at the free end of a piston rod having a piston slidable in a fluid actuating cylinder arranged with its axis normal to the path of movement of said bag-positioning means; valve-controlled means for introducing pressure fluid alternately into the opposite ends of the cylinder to repicrocate said carrier; and means for adjustably limiting the sliding movement of said carrier in a direction toward the positioned bag.

12. A machine as defined in claim 6 in which said bag-sealing means includes: a pair of elongate heating elements located at opposite sides of the path of advancing movement of the filled bag; fluid-actuated cylinders having pistons and piston rods sliadble in directions normal to said path of movement, said cylinders being mounted for axial movement in said directions, one heating element being carried by the cylinders and the other heating element being carried by said piston rods; and valve-controlled means for introducing pressure fluid alternately into the ends of the cylinders so as to effect relative axial movement between said cylinders and piston rods and thus move said heating elements toward and away from each other.

13. A machine as defined in claim 6 wherein said operating means comprises separate reversible fluid-actuated motor means for the bag-positioning means, the bag-opening and holding means, the bag-sealing means and the carrier; said control means comprising valve means for each motor means and solenoids for actuating said valve means, a plurality of electrical circuits, each solenoid being connected in a said circuit; switches in said circuits for closing and opening the same; and means for actuating said switches in predetermined sequence.

14. A machine as defined in claim 6 wherein said operating means comprises separate reversible fluid-actuated motor means for the bag-positioning means, the bag-opening and holding means, the bag-sealing means and the carrier; said control means comprising valve means for each motor means and solenoids for actuating said valve means, a plurality of electrical circuits, each solenoid being connected in a said circuit; switches in said circuits for closing and opening the same, including a manually-operable switch in the carrier circuit operative to close the latter so as to effect actuation of the carrier through an operative stroke, and a limit switch operable, in response to movement of the carrier through a predetermined operative stroke, to open said carrier circuit to deenergize the solenoid thereof so as to effect return movement of the carrier.

15. A machine as defined in claim 14 in which the switches for the bag-positioning, bag-opening and bag-sealing circuits are actuated to close their respective circuits in the order named and during the return movement of said carrier.

16. A packaging machine, comprising: a frame having a support for a stack of flat, heat-sealable bags having open mouths; bag positioning means for moving a bag from the stack to a predetermined position; bag-opening and -holding means insertable into the mouth of the positioned bag; a bag sealing means for closing the open mouth of the bag while the bag is stationary; a carrier for receiving articles, said carrier being movable in a direction to enter the opened mouth of the bag so as to insert the articles in the bag, said carrier being operative to advance the filled bag to said bag-sealing means with this bag engaging and pushing a previously sealed bag from the sealing means, said carrier being retractible from the filled bag advanced to the sealing means.

17. A packaging machine comprising a frame, a supply of empty containers, each having at least one unsealed end, a reciprocating loading member mounted on said frame for inserting material into one of said containers, means for gripping one of said empty containers and moving said one container into the path of said member so that its unsealed end faces said member, a plurality of container opening elements, means for inserting said elements into the mouth of said container at said unsealed end and engaging said elements with opposite side portions of said container to open and hold said container without projecting into the path of said member, and control means for moving said member forward into said container through said unsealed end to deposit said material and thereafter withdrawing said member.

18. A packaging machine as defined in claim 17 having means for producing a positive holding force on said material at the end of the forward movement of said member to prevent movement of said material during withdrawal of said member.

19. A packaging machine comprising a frame, a receptacle for a supply of empty containers each having at least one open end, a reciprocating carrier mounted on said frame for receiving articles for insertion into one of said containers, means for gripping one of said empty containers and moving said one container into the path of said carrier so that its open end faces said carrier, control means for moving said carrier forward into said container through said open end to deposit said articles and thereafter withdrawing said carrier, means for applying a holding force to said articles at the end of said forward movement to prevent movement of said articles during withdrawal of said carrier and means located at the end of the forward stroke of said carrier to close said open end after withdrawal of said carrier and prior to further movement of said container.

20. A packaging machine as defined in claim 19 wherein said gripping and moving means comprises a head member having a surface containing a plurality of openings, and vacuum means connected with said openings to cause said head to grip a surface of said container at said openings.

21. A packaging machine comprising a frame, a receptacle for a supply of flat, empty bags constructed of flexible material and each having an unsealed end, a reciprocating carrier mounted on said frame for receiving articles for insertion into one of said bags, means for gripping one of said empty bags and moving said one empty bag into loading position in the path of said carrier so that its unsealed end faces said carrier, means exterior of the bag for opening said bag after being gripped by said gripping means, means insertable into the unsealed end of said bag after the bag is opened and in said loading position for positively holding said bag open and shaping the unsealed end of said bag, and control means for moving said carrier forward into said bag through said unsealed end to deposit said articles and thereafter withdrawing said carrier.

22. A packaging machine as defined in claim 21 having means for holding said articles and filled bag at the end of the forward movement of said carrier to prevent movement thereof during withdrawal of said carrier.

23. A packaging machine as defined in claim 21 wherein said carrier moves said bag during its forward stroke to a sealing position, and sealing means for closing said unsealed end after withdrawal of said carrier from said container.

24. A packaging machine as defined in claim 21 wherein said bag gripping and moving means comprises a rotatable and simultaneously reciprocating head having a bag gripping surface thereon, and means for moving and rotating said head into position for said surface to engage and grip an empty bag and for thereafter moving and rotating said head to locate said bag in said loading position.

25. A packaging machine as defined in claim 24 having a plurality of openings in said surface, and vacuum means connected with said openings to cause said head to grip said empty bag at said openings.

26. A packaging machine as defined in claim 21 wherein said exterior bag opening means comprises a reciprocating head having a bag gripping surface thereon, and means operable after said bag is in said loading position for moving said head into position for said surface to engage and grip a portion of said empty bag and for thereafter reversing the movement of said head to open said bag between said head and said gripping means.

27. A packaging machine as defined in claim 26 having a plurality of openings in said surface, and vacuum means connected with said openings to cause said head to grip said empty bag at said openings.

28. A packaging machine as defined in claim 21 wherein said bag gripping and moving means comprises a reciprocating head having a bag gripping surface thereon, and means for moving said head into position for said surface to engage and grip a portion of an empty bag and for thereafter reversing the movement of said head to locate said bag in said loading position.

29. A packaging machine as defined in claim 28 wherein said exterior bag opening means comprises means for engaging the unsealed end of said bag during said reversing movement to open said end, and jet means directed into said opened end to maintain the open condition of said bag.

30. A packaging machine as defined in claim 21 wherein said insertable means comprises a pair of members pivotally mounted on said frame with an end of each member located adjacent said means for pivoting said member to closed position by moving said ends towards one another in order to move the ends away from said loading position, and means operative after said empty bag is opened and in loading position for pivoting said member to open position by moving said ends apart and into the unsealed end of said bag in order to hold said bag open and to shape to the unsealed end.

31. A packaging machine as defined in claim 30 having means responsive to the position of said members to prevent forward movement of said carrier until said members are in the open position.

32. A packaging machine as defined in claim 22 wherein said holding means comprises a reciprocating member located at the end of forward movement of said carrier, and control means for moving said member into contact with said filled bag after said carrier reaches the forward end of its stroke and for moving said member away from said filled bag after said carrier has moved rearwardly out of said filled bag.

33. A packaging machine as defined in claim 23 wherein said sealing means comprises a pair of sealing elements located on opposite sides of said unsealed end when said bag is in sealing position, and means operable after withdrawal of said carriage for moving said elements toward one another to engage and seal the unsealed end.

34. A packaging machine as defined in claim 23 wherein said sealing means comprises a pair of sealing elements extending transversely on the same side of said unsealed end when said bag is in sealing position, means for rotatably mounting the one element located nearest the end of the bag, and means operable after withdrawal of said carriage for rotating said one element into position above the other element to fold the end of the bag over and seal the bag between the two elements.

35. In a device for filling empty bags, a pair of pivotally mounted chute members, the pivots for said members being spaced apart, means for pivoting said members to move adjacent ends of said members towards one another and to permit an open end of said empty bag to be placed adjacent said ends and for pivoting said ends away from one another to insert said ends within said bag and hold said bag open, said pivoting means comprising an actuator means, a lost motion connection between said actuator means and said members to permit said actuator means to continue movement after engagement of said members with said bag, and means actuated by the continued movement of said actuator means for sensing the proper holding engagement of said members with said bag.

36. A device for sealing the open end of a flexible bag having a flap comprising a pair of sealing elements extending transversely on the under side of the open end of the bag, one of said elements being positioned at the point of sealing and the other element being positioned below said flap, and means for rotatively mounting said other element into position adjacent said one element to fold over the flap and seal the bag between the two elements.

37. A method of packaging articles in a flexible container with a reciprocating carrier, comprising the steps of loading the articles on the carrier, gripping an empty container and thereafter moving the empty container to a loading position to place an open end of the container in the path of the carrier, engaging opposite interior side portions of said container at the open end with holding elements to fully open the end of the container, moving said carrier into said container through said open end, and removing said carrier completely from said container while holding said articles.

38. In a device for gripping and moving an empty bag from a stack of bags to a loading position, a member monuted for reciprocating movement between said stack and said loading position, a bag gripping surface on said member for gripping the top empty bag of said stack upon reaching one end of the stroke of said member and for positioning said empty bag in the loading position upon reaching the other end of the stroke of said member, said member being continually positioned between said stack and said loading position, and means for rotating said member during movement in either direction in order to position said surface above said stack at one end of said stroke and position the gripped empty bag above said surface at the other end of said stroke.

39. In a device as defined in claim 38 wherein said rotating means comprises means for blocking rotation of said member until said surface has moved away from said stack toward the loading position.

40. In a device as defined in claim 38 having reciprocating bag opening means mounted above said loading position, a gripping area on said opening means, and means operative after said member is in loading position for moving said gripping area into contact with said empty bag being gripped by said member and thereafter moving said opening means away from said member to open said bag.

41. In a device as defined in claim 38 wherein said member is rotatably mounted on support means, actuator means for reciprocating said support means to reciprocate said member, said rotating means comprising a gear rack slidably supported on rod means extending in the direction of said reciprocating movement, a spring located on said rod means at each end of said rack and each spring being in engagement with a stop on said rod means spaced from each end of said rack, a pinion gear carried by said member and meshing with said rack to produce rotation of said member in opposite directions during reciprocation of said support means in opposite directions, and stop means for limiting the rotation of said member in each direction.

42. In a device as defined in claim 38 wherein said member is rotatably mounted on support means, first actuation means for reciprocating said support means to reciprocate said member, said rotating means comprising a rotatable gear rack movable with said support means, a pinion gear carried by said member and meshing with said rack, and second actuation means movable with said support means and connected with said gear rack to rotate said rack and said member during reciprocation of said support means by said first actuator means.

43. A packaging machine comprising a frame, a reciprocating carrier mounted on said frame for loading articles into the open end of a container during forward movement, means for positioning said container with the open end thereof in the path of said carrier, means for opening said open end of said positioned container, chute means pivotally mounted on said frame and having a portion thereof in the path of said carrier when said chute means is in closed position, means operative prior to movement of said carrier into said chute means for pivotally opening said chute means into the open end of said container to hold said container open and in position to receive said loaded carrier, said chute means being clear of said carrier when in the open position, and means operative in response to rearward movement of said carrier to close said chute means.

44. A packaging machine comprising a frame, a supply of empty containers, each having at least one unsealed end, a reciprocating carrier mounted on said frame for receiving articles for insertion into one of said containers, means for gripping one of said empty containers and moving said one container into the path of said carrier so that its unsealed end faces said carrier, means insertable into and engaging opposite sides of said unsealed end to open and hold said container without projecting into the path of said carrier, control means for moving said carrier forward into said container through said unsealed end to deposit said articles and thereafter withdrawing said carrier, said carrier positioning said one container at the end of its forward stroke in a sealing position, and sealing means for closing said unsealed end after withdrawal of said carrier from said container and prior to further movement of said container.

45. A packaging machine comprising a frame, a supply of empty containers, each having at least one unsealed end, a reciprocating carrier mounted on said frame for receiving articles for insertion into one of said containers, means for gripping one of said empty containers and moving said one container into the path of said carrier so that its unsealed end faces said carrier, means insertable into and engaging opposite sides of said unsealed end to open and hold said container without projecting into the path of said carrier, control means for moving said carrier forward into said container through said unsealed end to deposit said articles and thereafter withdrawing said carrier, said gripping and moving means comprising a member movable between said supply and the path of said carrier, said member having means for gripping a flat surface of said container.

46. A packaging machine as defined in claim 39 wherein said member has a surface containing a plurality of openings, and vacuum means connected with said openings to cause said member to grip said flat surface at said openings.

47. A packaging machine comprising a frame, a reciprocating loading member mounted on said frame for loading material into the open end of a container, means for gripping the container and moving said container into position with the open end thereof in the path of said loading member, chute means pivotally mounted on said frame and having a portion thereof in the path of said loading member when said chute means is in closed position, and means operative prior to movement of said loading means towards said chute means for pivotally opening said chute means into the open end of said container to hold said container open and in position to receive said material, said chute means being clear of said loading member when in the open position.

References Cited in the file of this patent

UNITED STATES PATENTS

| | | |
|---|---|---|
| 1,950,186 | Lofman | Mar. 6, 1934 |
| 2,001,009 | Baker | May 14, 1935 |
| 2,301,354 | Alden | Nov. 10, 1942 |
| 2,685,995 | Feeser | Aug. 10, 1954 |
| 2,689,073 | Twigg | Sept. 14, 1954 |
| 2,725,168 | Lindstaedt et al. | Nov. 29, 1955 |
| 2,746,221 | Rouan et al. | May 22, 1956 |
| 2,766,569 | Strother et al. | Oct. 16, 1956 |